(12) United States Patent
Uemura

(10) Patent No.: US 12,068,496 B2
(45) Date of Patent: Aug. 20, 2024

(54) BATTERY SYSTEM INCLUDING EXTERIOR CASE FIXED TO VEHICLE VIA EXTERNAL FIXING BRACKETS AND VEHICLE EQUIPPED WITH BATTERY SYSTEM

(71) Applicant: SANYO Electric Co., Ltd., Osaka (JP)

(72) Inventor: Yasuaki Uemura, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 800 days.

(21) Appl. No.: 17/262,253

(22) PCT Filed: Jul. 26, 2019

(86) PCT No.: PCT/JP2019/029341
§ 371 (c)(1),
(2) Date: Jan. 22, 2021

(87) PCT Pub. No.: WO2020/026963
PCT Pub. Date: Feb. 6, 2020

(65) Prior Publication Data
US 2021/0351470 A1 Nov. 11, 2021

(30) Foreign Application Priority Data
Jul. 30, 2018 (JP) ................................ 2018-142372

(51) Int. Cl.
*H01M 50/244* (2021.01)
*B60K 1/04* (2019.01)
(Continued)

(52) U.S. Cl.
CPC ............. *H01M 50/244* (2021.01); *B60K 1/04* (2013.01); *B60L 50/64* (2019.02);
(Continued)

(58) Field of Classification Search
CPC ............. H01M 50/244; H01M 50/249; H01M 50/231; H01M 50/262; H01M 50/209;
(Continued)

(56) References Cited

U.S. PATENT DOCUMENTS

2010/0297486 A1 11/2010 Fujii
2013/0017436 A1 1/2013 Kume
(Continued)

FOREIGN PATENT DOCUMENTS

CN 101894984 A 11/2010
CN 104900825 A 9/2015
(Continued)

OTHER PUBLICATIONS

English Translation of Search Report dated Jul. 18, 2022, issued in counterpart CN Application No. 201980050851.8. (2 pages).
(Continued)

*Primary Examiner* — Sean P Cullen
(74) *Attorney, Agent, or Firm* — WHDA, LLP

(57) ABSTRACT

The vehicle battery system includes a plurality of battery blocks including a plurality of battery cells and an exterior case that stores the plurality of battery blocks. The exterior case includes a tubular case in which the upper case is fixed to lower case, a pair of end face plates fixed to both ends of the tubular case to close the openings at both ends, and partition walls fixed to the middle portion of the tubular case. Lower case, the upper case, end face plates, and partition walls are made of pressed metal plates, lower case has a groove shape having side walls coupled to both sides of bottom plate, having coupling ribs coupled to an upper end edge of side walls, and having a same shape in a cross section at each portion separated in a longitudinal direction, the plurality of battery blocks are disposed in the longitudinal direction in an orientation extending in the longitudinal
(Continued)

direction of the tubular case, and fixed to the exterior case, and the exterior case is further fixed to the vehicle via external fixing brackets.

15 Claims, 13 Drawing Sheets

(51) Int. Cl.
*B60L 50/64* (2019.01)
*H01M 50/209* (2021.01)
*H01M 50/224* (2021.01)
*H01M 50/231* (2021.01)
*H01M 50/249* (2021.01)
*H01M 50/262* (2021.01)
*H01M 50/276* (2021.01)
*H01M 50/284* (2021.01)
*H01M 50/291* (2021.01)

(52) U.S. Cl.
CPC ....... *H01M 50/209* (2021.01); *H01M 50/224* (2021.01); *H01M 50/231* (2021.01); *H01M 50/249* (2021.01); *H01M 50/262* (2021.01); *H01M 50/276* (2021.01); *H01M 50/284* (2021.01); *H01M 50/291* (2021.01); *H01M 2220/20* (2013.01)

(58) Field of Classification Search
CPC ............. H01M 50/276; H01M 50/224; H01M 50/291; H01M 50/284

USPC ................ 429/99, 100, 156, 158, 159, 160; 180/68.5

See application file for complete search history.

(56) References Cited

U.S. PATENT DOCUMENTS

| | | | |
|---|---|---|---|
| 2015/0171390 A1* | 6/2015 | Yoshioka | H01M 50/271 180/65.21 |
| 2015/0255764 A1 | 9/2015 | Loo et al. | |
| 2018/0050607 A1* | 2/2018 | Matecki | B60L 50/64 |
| 2019/0081298 A1* | 3/2019 | Matecki | B60R 19/12 |
| 2019/0381899 A1* | 12/2019 | Günther | B60L 50/64 |

FOREIGN PATENT DOCUMENTS

| | | | |
|---|---|---|---|
| DE | 102016120826 A1 * | 5/2018 | ............... B60K 1/04 |
| EP | 2916369 A1 | 9/2015 | |
| JP | 2013-020855 | 1/2013 | |
| JP | 2018-037173 A | 3/2018 | |

OTHER PUBLICATIONS

Extended (Supplementary) European Search Report dated Aug. 9, 2021, issued in counterpart EP Application No. 19845220.3. (6 pages).
International Search Report of PCT application No. PCT/JP2019/029341 dated Oct. 8, 2019.
English translation of Search Report dated Feb. 22, 2023, issued in counterpart CN Application No. 201980050851.8. (2 pages).

* cited by examiner

BATTERY SYSTEM INCLUDING EXTERIOR CASE FIXED TO VEHICLE VIA EXTERNAL FIXING BRACKETS AND VEHICLE EQUIPPED WITH BATTERY SYSTEM

CROSS-REFERENCE TO RELATED APPLICATIONS

This application is a U.S. national stage application of the PCT International Application No. PCT/JP2019/029341 filed on Jul. 26, 2019, which claims the benefit of foreign priority of Japanese patent application No. 2018-142372, filed on Jul. 30, 2018, the contents all of which are incorporated herein by reference.

TECHNICAL FIELD

The present invention relates to a battery system for a vehicle used as a power source for a motor for driving an electric vehicle such as a hybrid car, a plug-in hybrid car, and an electric vehicle, and a vehicle equipped with the battery system.

BACKGROUND ART

A battery system that is installed in an electric vehicle such as a hybrid car or a plug-in hybrid car to supply electric power to a traveling motor has a plurality of battery blocks connected in series or in parallel in order to achieve the maximum output and charge and discharge capacity required for the vehicle model to be installed. Furthermore, most of the hybrid cars currently on the market are actually manufactured in the same model and run only on the engine. In addition, in the types in which both the type that runs only on the engine and the hybrid car are manufactured, the hybrid car is a part of the whole, and it is the reality that the hybrid car is achieved by mounting a battery system and a running motor to the vehicle that runs only on the engine. This type of hybrid car is adopted in many vehicle models because it does not require major design changes such as the chassis of the vehicle. On the other hand, since the chassis of the vehicle is designed based on the type that runs only on the engine in this type of hybrid car, it is necessary to specially design the battery system such that the battery system is adapted for the chassis of each vehicle model. Thus, it is difficult to standardize the design of the battery system such that the same battery system can be used in different vehicle models, and it is necessary to specially design the battery system such that the battery system is adapted for each vehicle model, which causes an adverse effect of increasing the manufacturing cost.

Furthermore, it is necessary in the battery system installed in various vehicle models that a number of battery blocks connected in series or in parallel is changed in order to achieve the maximum output and charge and discharge capacity suitable for the vehicle, and further that the output and capacity of each battery block is changed to set the output and capacity as a system to the optimum value. As a battery system in which a plurality of battery blocks are disposed in the exterior case, such a structure that two sets of battery blocks are disposed in a parallel position to form a parallel unit of batteries, and two sets of parallel units are disposed in the longitudinal direction and stored in the exterior case has been developed. (See PTL 1)

CITATION LIST

Patent Literature

PTL 1: Unexamined Japanese Patent Publication No. 2013-020855

SUMMARY OF THE INVENTION

As described above, the vehicle battery system needs to have an outer shape adapted for the vehicle model to be installed, and further needs to be designed and manufactured exclusively for each of various vehicle models to be installed, in order to achieve the maximum output and charge and discharge capacity required for the vehicle model, and this is the cause of the increase in the manufacturing cost of the vehicle battery system.

The present invention has been developed for the purpose of eliminating the above drawbacks, and one of the purposes of the present invention is to provide a technique for mounting a battery system on various vehicles while the manufacturing costs are reduced.

A vehicle battery system according to an aspect of the present invention is a battery system including: a plurality of battery blocks including a plurality of battery cells; and an exterior case that stores the plurality of battery blocks, wherein the exterior case includes: a tubular case that fixes an upper case to a lower case to have a tubular shape; a pair of end face plates that are fixed to both ends of the tubular case to close openings at the both ends of the tubular case; and partition walls that are fixed to a middle portion of the tubular case, the lower case, the upper case, the end face plate, and the partition wall are made of a pressed metal plate, the lower case has a groove shape having side walls coupled to both sides of a bottom plate, having coupling ribs coupled to an upper end edge of the side walls, and having a same shape in a cross section at each portion separated in a longitudinal direction, the plurality of battery blocks are disposed in the longitudinal direction in an orientation extending in the longitudinal direction of the tubular case, and fixed to the exterior case, and the exterior case is further fixed to the vehicle via external fixing brackets.

Furthermore, a vehicle mounting a battery system having the components described in the above aspect includes: the battery system; a driving motor powered by the battery system; a vehicle body mounting the battery system and the driving motor; and wheels that are driven by the driving motor to drive the vehicle body, wherein the battery system is fixed to the vehicle via the external fixing brackets.

The vehicle battery system of a certain aspect of the present invention has a feature that the manufacturing cost can be reduced while having a structure that can be mounted on various vehicles. It is because the above battery system has such a structure that the upper case is fixed to the lower case to form a tubular case, both ends of the tubular case are closed with end face plates, partition walls are provided in the middle to partition the inside, the lower case, the upper case, the end face plates, and partition walls are manufactured by pressing a metal plate, and further, the shape of the lower case has a groove shape having side walls coupled to both sides of a bottom plate, having coupling ribs coupled to an upper end edge of the side walls, and having a same shape in a cross section at each portion separated in a longitudinal direction, a plurality of battery blocks are disposed in the longitudinal direction in an orientation extending in the longitudinal direction of the tubular case and fixed to the exterior case, and the exterior case is further fixed to the vehicle via external fixing brackets.

A vehicle equipped with a battery system of a certain aspect of the present invention is characterized in that the battery system can be fixed in an optimum position of the vehicle while reducing the manufacturing cost of the battery system. It is because the above vehicle has such a structure of the mounted battery system that the upper case is fixed to the lower case to form a tubular case, both ends of the tubular case are closed with end face plates, partition walls are provided in the middle to partition the inside, the lower case, the upper case, the end face plates, and partition walls are manufactured by pressing a metal plate, and further, the shape of the lower case has a groove shape having side walls coupled to both sides of a bottom plate, having coupling ribs coupled to an upper end edge of the side walls, and having a same shape in a cross section at each portion separated in a longitudinal direction, a plurality of battery blocks are disposed in the longitudinal direction in an orientation extending in the longitudinal direction of the tubular case and fixed to the exterior case, and the battery system is further fixed to the vehicle by fixing external fixing brackets.

DESCRIPTION OF EMBODIMENTS

Figure 1:
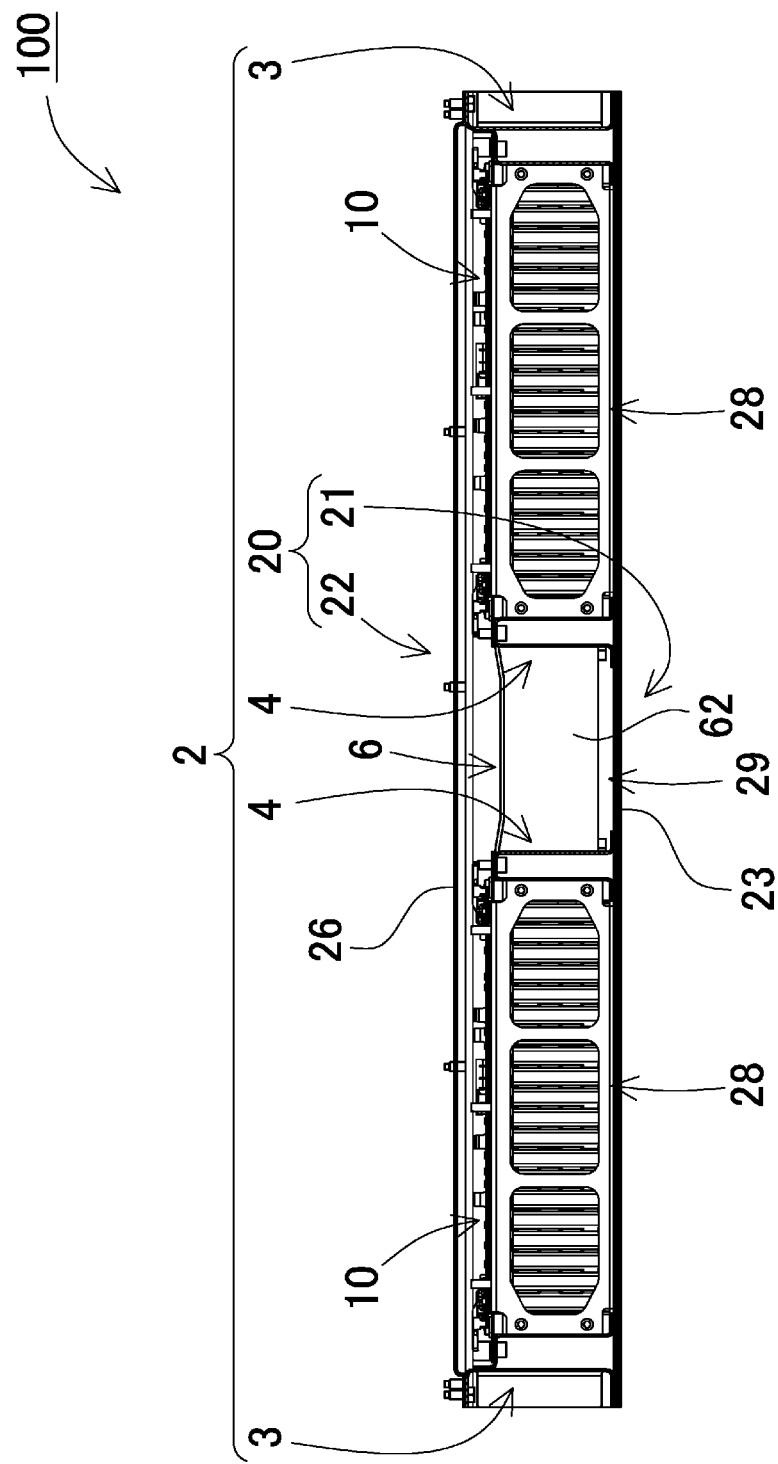
FIG. 1 is a vertical cross-sectional view of a battery system according to an exemplary embodiment of the present invention.

A vehicle battery system of an aspect of the present invention may be specified by the following configuration. The battery system includes a plurality of battery blocks composed of a plurality of battery cells and an exterior case for storing the plurality of battery blocks. The exterior case includes: a tubular case that fixes an upper case to a lower case to have a tubular shape; a pair of end face plates that are fixed to both ends of the tubular case to close openings at the both ends of the tubular case; and partition walls that are fixed to a middle portion of the tubular case, wherein the lower case, the upper case, the end face plate, and the partition wall are made of a pressed metal plate, the lower case has a groove shape having side walls coupled to both sides of a bottom plate, having coupling ribs coupled to an upper end edge of the side walls, and having a same shape in a cross section at each portion separated in a longitudinal direction. The plurality of battery blocks are disposed in the longitudinal direction in an orientation extending in the longitudinal direction of the tubular case and fixed to the exterior case. Furthermore, the exterior case is fixed to the vehicle via external fixing brackets.

In addition, in the battery system for a vehicle, the upper case may be composed of a flat metal plate or a groove-shaped metal plate shallower than the lower case.

In the above battery system, both sides of the lower case can be reinforced with high side walls to improve bending strength, and a heavy battery block can be fixed to the strong case to make the exterior case a sturdy structure. Furthermore, since the sturdy exterior case is fixed to the vehicle via the external fixing bracket of another part made of a metal plate different from that of the exterior case, there is such a feature that the position to fix the external fixing bracket to the exterior case can be adjusted to fix the exterior case in the optimum state in consideration of the vibration, deformation, resonance frequency, and the like of the exterior case.

Furthermore, in the vehicle battery system, the end face plate is composed of multi-layered metal plates, each metal plate has welded pieces, which come into surface contact with the inner surface by moving in the longitudinal direction of the lower case, on the lower edge and both side edges, the welded piece at the lower edge may be closely adhered and welded to the inner surface of the bottom plate, and the welded pieces at both side edges may be closely adhered and welded to the inner surface of the side wall.

The above battery system has a feature that the end face plates can be made to have a tough structure, and further that the fixing position of the tubular case can be finely adjusted to be firmly fixed to the optimum position. It is because the end face plates of the above battery system provide welded pieces, which come into surface contact with the inner surface by moving in the longitudinal direction of the lower case, on the lower edge and both side edges of each metal plate as a multi-layered metal plate, the welded piece provided on the lower edge is closely adhered and welded to the inner surface of the bottom plate, and the welded pieces provided on both side edges are closely adhered, welded, and fixed to the inner surface. In particular, the welded piece that moves in the longitudinal direction of the lower case and comes into surface contact with the inner surface can be finely adjusted in the fixed position, and even if the fixed position is changed, it adheres in a surface contact state, so that there is such a feature that spot welding can be achieved in an ideal state to fix it firmly.

Furthermore, the vehicle battery system may have a multi-layer structure in which the end face plates have a gap between the metal plates.

Since the above battery system has a gap between the metal plates, the lower case can be reinforced at a plurality of places to further increase the bending strength.

Furthermore, the vehicle battery system may have such a feature that the end face plates are composed of two metal plates of an outer metal plate located on the outer side and an inner metal plate located on the inner side, the upper ends of the inner metal plate and the outer metal plate are coupled by a welded structure, the outer metal plate and the inner metal plate have welded pieces which come into surface contact with the inner surface of the lower case along the lower edge and the both side edges, the welded pieces of the lower edges of the outer metal plate and inner metal plate are welded to the bottom plate, and the welded pieces on both sides of the outer metal plate and inner metal plate are welded to the inner surface of the side walls.

In the above battery system, the end face plates are composed of two metal plates of an outer metal plate in the outside and an inner metal plate in the inside, the inner metal plate and the outer metal plate are welded and coupled at the upper end, the welded pieces, which come in surface contact with the inner surface of the lower case, are provided on the lower edge and the both side edges of both of the inner metal plate and the outer metal plate, the welded pieces on the lower edge of the outer metal plate and the inner metal plate are welded to the bottom plate, and the welded pieces on the both sides of the outer metal plate and the inner metal plate are welded to the inner surface of the side walls to be fixed to the lower case, so that the strength of the lower case of both of the outer metal plate and the inner metal plate, in particular, the strength in the twisting direction can be further improved. Therefore, there is a feature that heavy battery blocks can be fixed to a tough exterior case to more effectively prevent adverse effects such as deformation, vibration, and resonance.

Furthermore, the vehicle battery system may have such a structure that an upper edge rib formed by bending the inner metal plate at a right angle along the upper edge is included, the upper edge rib has an L-shape having a horizontal rib and sub-welded pieces coupled in a right angle, one of the side edges of the horizontal rib is coupled to the upper edge of the inner metal plate at a right angle, and the other of the side edges is coupled to the sub-welded pieces, and the sub-welded pieces are welded to the inner surface of the outer metal plate.

The above battery system has a feature that the lower edge of the end face plate can be reinforced by the upper edge rib having an L-shaped cross section provided on the lower edge of the inner metal plate.

Furthermore, the vehicle battery system may have such a structure that the partition walls each have a groove shape made by coupling the upper edges of two vertical walls with a horizontal plate, the partition walls each has welded pieces on a lower edge and both side edges and the welded pieces on the lower edge are welded to the bottom plate of the lower case, and the welded pieces on the both side edges are welded to the side walls of the lower case.

In the above battery system, the partition walls each have a groove shape made by coupling the upper edges of two vertical walls, and the welded pieces provided on the lower edge and the both side edges of each vertical wall are welded and fixed to the bottom plate and the side walls of the lower case, so that there are such features that the middle part of the lower case is reinforced with two vertical walls to significantly improve the bending strength and torsional strength of the lower case, and that the heavy battery blocks can be fixed to prevent deformation, vibration, resonance, and the like of the lower case more effectively.

Furthermore, in the vehicle battery system, the lower case and the external fixing brackets may be composed of metal plates having different thicknesses.

In the above battery system, the lower case and the external fixing bracket are made of metal plates with different thicknesses, so that there are such features that the exterior case has a structure in which a plurality of heavy battery blocks are fixed to achieve sufficient strength, the external fixing brackets that fix this to the vehicle prevent vibration and deformation of the exterior case that fixes the heavy battery blocks, and further it is possible to adjust the resonance frequency and the like to effectively prevent adverse effects due to resonance of the exterior case and battery block such as anti-vibration, breakage, deformation, and the like.

Furthermore, in the vehicle battery system, the lower case and the end face plates may be composed of metal plates having different thicknesses.

The above battery system has the feature that the thicknesses of the lower case and the end face plates can be adjusted to optimally design the bending strength of the exterior case in the three-dimensional direction to reduce the harmful effects of vibration and deformation on the battery blocks. For example, there are such features that both ends of exterior case can be reinforced more strongly by making the end face plate thicker than the lower case, and conversely the resonance frequency and the bending state of exterior case can be adjusted to control the characteristics of exterior case to absorb the impact by making the end face plate thinner than the lower case.

Furthermore, in the vehicle battery system, the lower case and the partition wall may be made of metal plates having different thicknesses.

The above battery system has the feature that the thicknesses of the lower case and the partition walls can be adjusted to optimally design the bending strength at the center of the exterior case in the three-dimensional direction to reduce the harmful effects of vibration and deformation on the battery blocks. For example, there are such features that the center of the exterior case can be reinforced more strongly by making the partition walls thicker than the lower case, and conversely the resonance frequency and the bending state of the exterior case can be adjusted to control the characteristics of the exterior case to absorb the impact by making the partition walls thinner than the lower case.

Furthermore, the vehicle battery system may have such a configuration that the vehicle battery system includes a circuit board connected to the battery blocks, the partition walls are disposed and fixed in two rows in the middle of the tubular case, the board space is provided between the two rows of partition walls, and the circuit board is disposed in the board space.

The above battery system has a feature that the outer shape can be thinned while the circuit board is built in the exterior case. In addition, since the circuit board can be arranged in the middle of the exterior case, the wiring between each battery block and the circuit board can be set to the shortest distance, so that the power loss can be reduced and the influence of noise or the like can be reduced. Furthermore, by shielding the circuit board with the partition walls on both sides, there is a feature that the adverse effect of noise on the circuit board can be further reduced.

Furthermore, the vehicle battery system may have such a configuration that the lower case has a fitting portion for specifying the fixing position of the external fixing bracket by the fitting structure, and a plurality of fitting portions are provided separately in the longitudinal direction of the side walls of the lower case.

The above battery system has a feature that the position where the external fixing bracket is fixed to the lower case can be adjusted in the longitudinal direction and fixed so as not to be displaced. This battery system has a feature that the optimum position of the exterior case can be attached to the vehicle in consideration of the length of the exterior case and a number and arrangement of the built-in battery blocks.

Furthermore, the vehicle battery system may have a feature that a plurality of external fixing brackets are fixed on both sides of the lower case.

Furthermore, a vehicle equipped with a battery system having the components of the above aspects may be specified by the following configuration. A vehicle mounting a battery system includes: the battery system; a driving motor powered by the battery system; a vehicle body mounting the battery system and the driving motor; and wheels that are driven by the driving motor to drive the vehicle body, wherein the battery system is fixed to the vehicle via the external fixing brackets.

Furthermore, the vehicle equipped with the battery system may have a configuration that the battery system is fixed to the chassis of the vehicle.

The above vehicles have features that the battery system is fixed at the optimum position of each chassis to lower the position of the center of gravity of the vehicle to achieve excellent handling, the exterior case fixed to the chassis reinforces a part of the chassis, the body rigidity of the vehicle can be improved, the rigidity of each of the external fixing brackets and the exterior case fixed to the chassis can be adjusted, the hardness and coupling positions of the exterior case and the external fixing brackets can be changed to optimally design the entire chassis, and favorable handling and riding comfort can be controlled by suppressing chassis vibration and resonance. In particular, the vehicle cannot achieve ideal handling with a rigid body that does not deform the chassis at all. The handling of the vehicle is controlled to the ideal state by adjusting the body rigidity, the elasticity of the spring supporting the vehicle, the damping force of the shock absorber and the like, and in particular, the partial rigidity of the chassis affects the handling, so that it is also important to be able to adjust the rigidity of each of the exterior case and the external fixing brackets, for example. The vehicle, in which the battery system is fixed to the chassis, the exterior case is separated into the lower case, upper case, end face plate, and partition walls and made of different metal plates, and further the external fixing brackets that fix this exterior case to the chassis are also fixed to the chassis as separate parts, has a feature that the rigidity of each part can be adjusted to the optimum value to control the partial rigidity of the chassis and improve the handling.

Furthermore, a vehicle equipped with a battery system may have a configuration that the chassis of the vehicle has protrusions protruding from the upper surface and extending in parallel with each other, and the battery system is disposed between the adjacent protrusions to fix the exterior case to the protrusions via the external fixing brackets.

In the above vehicles, since the exterior case is fixed between adjacent parallel protrusions, there are features that the exterior case can increase the rigidity between the adjacent protrusions, and that the battery system can also be used for the improvement of the vehicle body rigidity.

Furthermore, the vehicle equipped with the battery system may be configured to fix the battery system to the chassis via a plurality of external fixing brackets.

Since the position of fixing the exterior case to the chassis can be adjusted by a plurality of external fixing brackets, the above-mentioned vehicle has such a feature that the deformed state of the chassis can be controlled in an ideal direction when an impact or bending stress is applied.

Hereinafter, the present invention will be described in detail with reference to the drawings. It should be noted that in the following description, terms indicating a specific direction or position (for example, "upper", "lower", and other terms including those terms) are used as necessary, but the use of these terms is to facilitate the understanding of the invention with reference to the drawings, and the meaning of these terms does not limit the technical scope of the present invention. In addition, the parts having the same reference numerals appearing in a plurality of drawings indicate the same or equivalent parts or members.

Furthermore, the exemplary embodiment shown below shows a specific example of the technical idea of the present invention, and does not limit the present invention to the following. In addition, unless otherwise specified, the dimensions, materials, shapes, relative arrangements, and the like of the components described below are not intended to limit the scope of the present invention only thereto, but intended to be exemplified. In addition, the contents described in the exemplary embodiment or example can be applied to other exemplary embodiments or examples. In addition, the size, positional relationship, and the like of the members shown in the drawings may be exaggerated in order to clarify the explanation.

Figure 2:
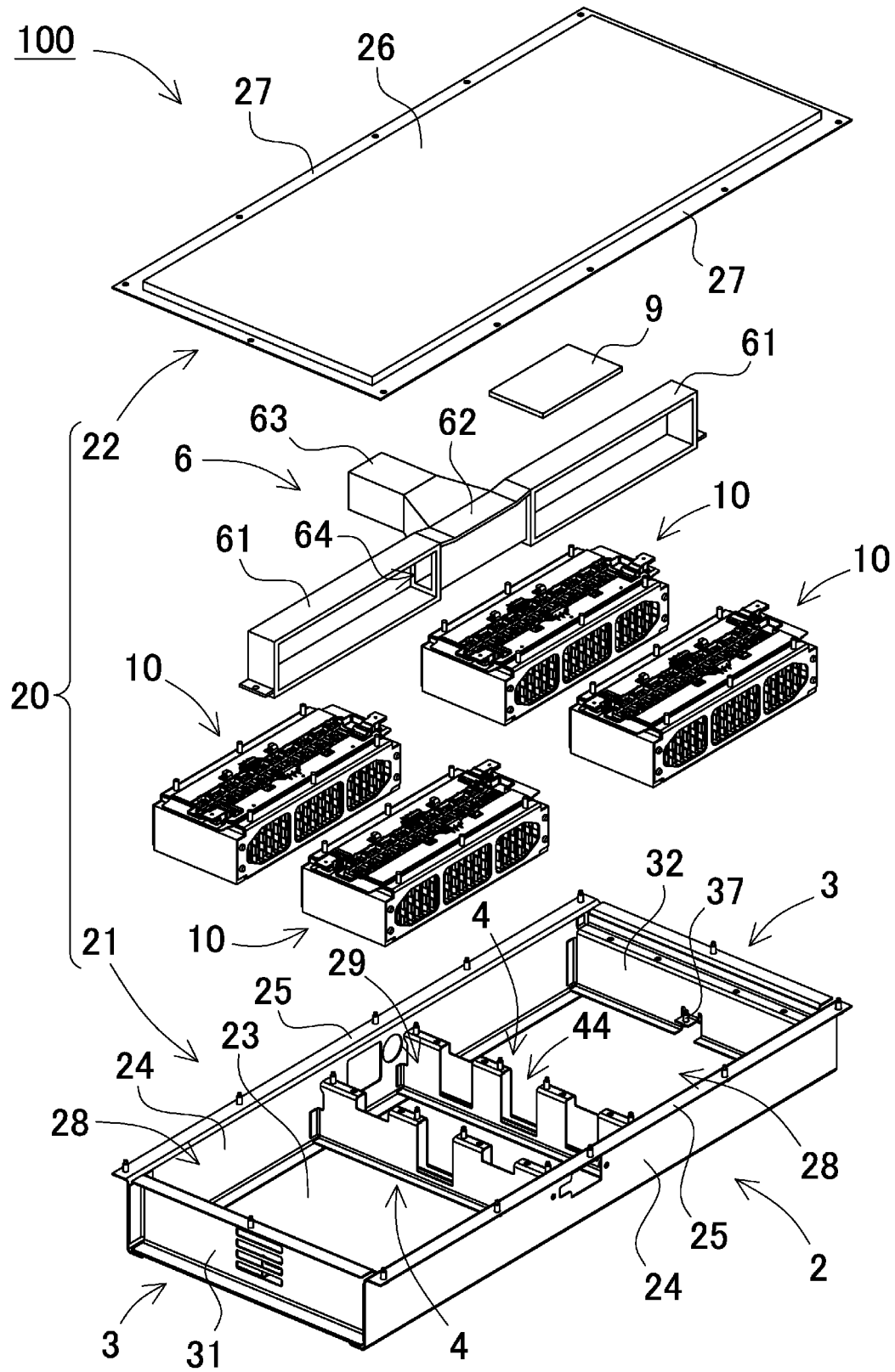
FIG. 2 is an exploded perspective view of the battery system according to the exemplary embodiment of the present invention.
Figure 3:
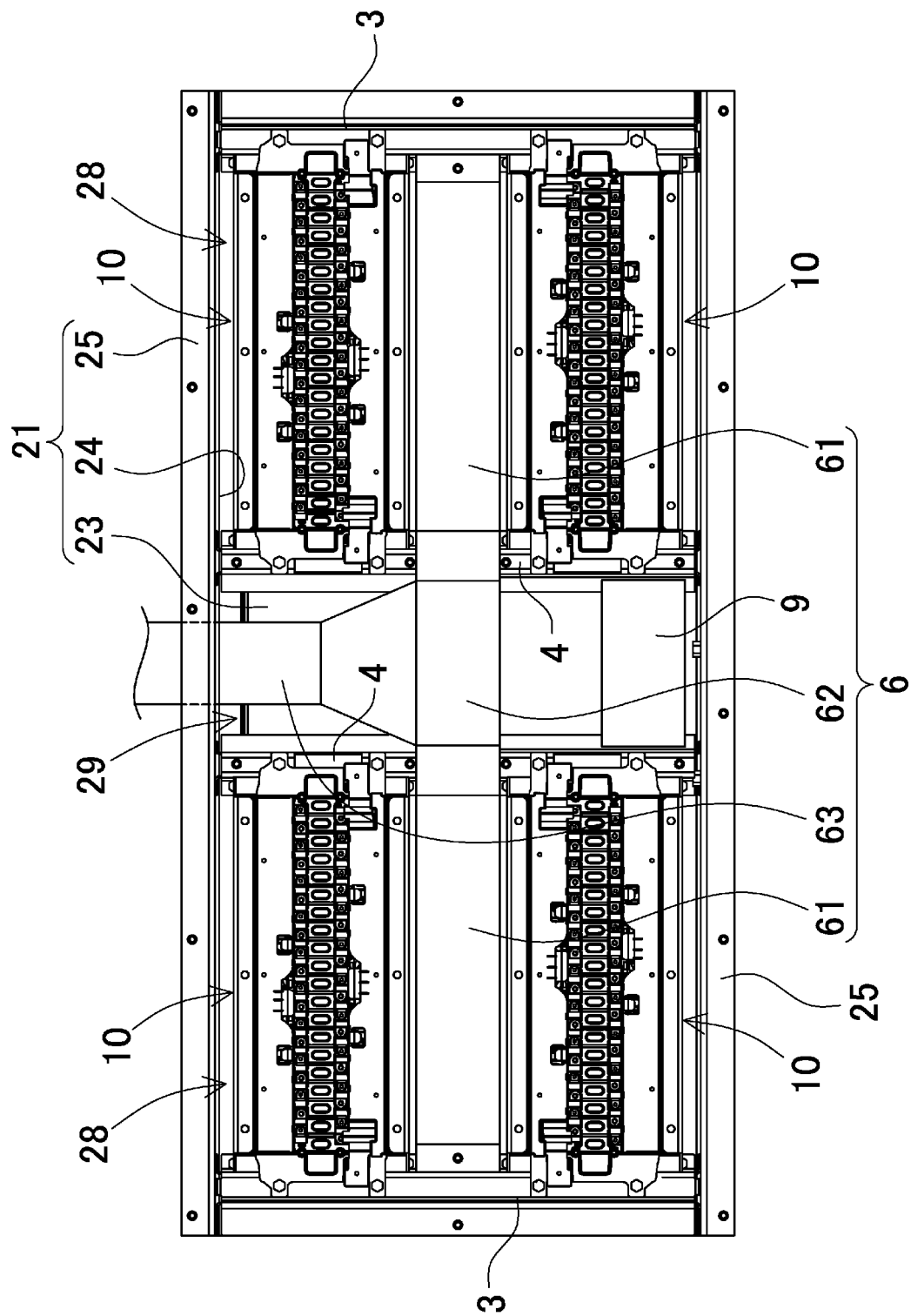
FIG. 3 is a plan view showing an internal structure of the battery system shown in FIG. 1.

FIG. 1 to FIG. 3 illustrate a battery system for a vehicle according to an exemplary embodiment of the present invention. Battery system 100 shown in these figures is mainly mounted on a vehicle such as a hybrid car, a plug-in hybrid car, or an electric vehicle, and is used as a power source for driving the vehicle by supplying electric power to the traveling motor of the vehicle.

(Battery System 100)

Battery system 100 shown in FIG. 1 to FIG. 3 includes a plurality of battery blocks 10 composed of a plurality of battery cells 1 and exterior case 2 accommodating the plurality of battery blocks 10. In battery system 100 shown in the figure, exterior case 2 has a substantially elongated box shape, and the plurality of battery blocks 10 are stored inside exterior case 2. In battery system 100 of FIG. 2 and FIG. 3, four sets of battery blocks 10 are stored in fixed positions of exterior case 2.

(Battery Block 10)

Figure 4:
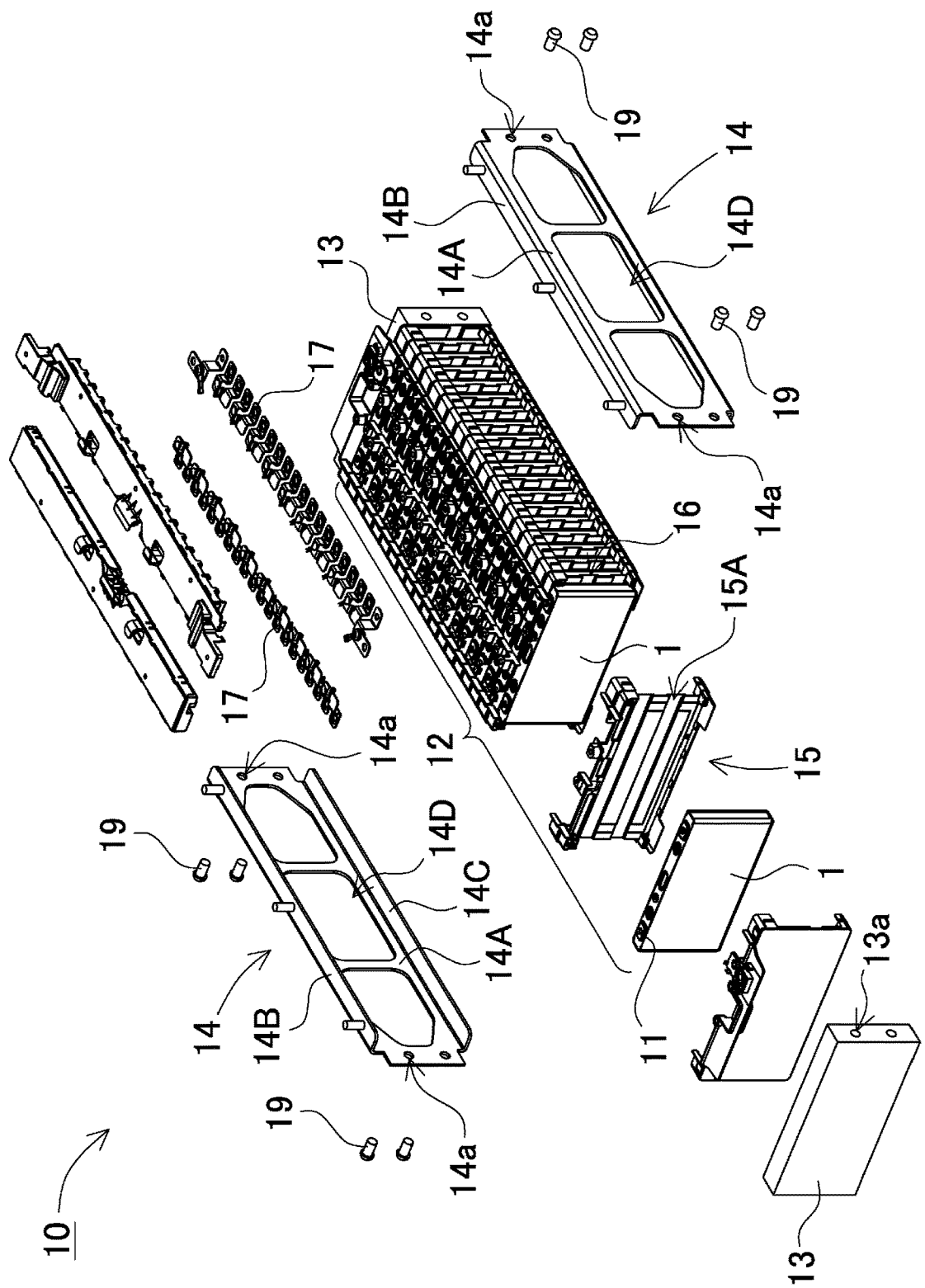
FIG. 4 is an exploded perspective view of a battery block.

Battery block 10 shown in FIG. 4 includes battery laminate body 12 in which a plurality of battery cells 1 are laminated, a pair of end plates 13 disposed at both ends of battery laminate body 12, and bind bar 14 having both ends fixed to end plates 13 to fix battery laminate body 12 in a pressurized state. As shown in FIG. 4, in this battery block 10, many battery cells 1 are laminated to form battery laminate body 12, battery laminate body 12 is sandwiched between end plates 13 from both end faces in the laminating direction, and end plates 13 at both ends are coupled by bind bar 14 to fix battery laminate body 12 in a pressurized state to form an elongated box shape as a whole.

(Battery Cell 1)

As shown in the figure, battery cell 1 is a square battery having a width wider than the thickness, in other words, a square battery thinner than the width, and is laminated in the thickness direction to form battery laminate body 12. Battery cell 1 is a non-aqueous electrolyte secondary battery such as a lithium ion secondary battery. Battery system 100 in which the lithium ion secondary battery is used as battery cell 1 can increase the charge and discharge capacity with respect to the volume and weight. However, battery cell 1 is not specified as the lithium ion battery, and any rechargeable battery such as a nickel hydrogen battery and can also be used.

In battery cell 1, positive and negative electrode plates are stored together with an electrolytic solution in an exterior can having a closed structure. The exterior can is made by press-molding a metal plate such as aluminum or an aluminum alloy into a square shape, and the opening is hermetically sealed with a sealing plate. The sealing plate is made of aluminum or an aluminum alloy that is the same material as that of the exterior can, and positive and negative electrode terminals 11 are fixed to both ends. Furthermore, the sealing plate is provided with an opening of a gas discharge valve between positive and negative electrode terminals 11. The gas discharge valve opens when the internal pressure of battery cell 1 becomes higher than the set value to prevent the exterior can and the sealing plate from being damaged.

(Battery Laminate Body 12)

The plurality of battery cells 1 are laminated such that the thickness direction of each battery cell 1 is the laminating direction to form battery laminate body 12. In battery cell 1, terminal surfaces provided with positive and negative electrode terminals 11 are disposed on the same plane, and the plurality of battery cells 1 are laminated to form battery laminate body 12. In battery laminate body 12, metal bus bar 17 is connected to positive and negative electrode terminals 11 of adjacent battery cells 1, and the plurality of battery cells 1 are connected in series or in parallel, or in series and in parallel by bus bar 17. Battery block 10 shown in the figure has 20 battery cells 1 connected in series. However, the present invention does not specify a number of battery cells 1 configuring battery laminate body 12 and the connection state thereof.

(Separator 15)

As shown in FIG. 4, battery laminate body 12 sandwiches separator 15 between laminated battery cells 1. Separator 15 is sandwiched between battery cells 1 configuring battery laminate body 12 to insulate adjacent battery cells 1 from each other. Separator 15 has a shape that allows both sides to be fitted to battery cell 1, and can be laminated to prevent misalignment of adjacent battery cells 1. Separator 15 in FIG. 4 insulates the exterior cans of adjacent battery cells 1 and provides cooling gap 16 for cooling battery cells 1 between separator 15 and battery cells 1. Separator 15 is manufactured by molding a plastic insulating material. Separator 15 in the figure is provided with blower grooves 15A on both sides, and cooling gap 16 is provided between separator 15 and battery cells 1. Separator 15 is provided with blower grooves 15A so as to open in the horizontal direction in the figure, in other words, on both sides of battery cell 1. Cooling gap 16 formed by separator 15 cools battery cell 1 by blowing cooling gas in the horizontal direction.

Separator 15 described above is provided with blower grooves 15A, and the cooling gas is passed through cooling gap 16 to cool battery cell 1, but the separator does not necessarily have to be provided with blower groove on the surface. This is because, although not shown, a cooling plate can be fixed to the surface of the battery laminate body in a heat-coupled state, and the battery cell can be cooled from the surface by the cooling plate. In this case, the separator can be made into a structure not provided with any cooling gaps between the battery cells in a flat shape in which the portion sandwiched between the battery cells has no blower groove, or can be manufactured in a thin sheet shape with an insulating material. In addition, the separator may have heat insulating properties in addition to electrically insulating properties in order to suppress heat transfer between the adjacent battery cells.

(End Plate 13)

End plates 13 are disposed at both ends of battery laminate body 12. End plates 13 are coupled to bind bars 14, pressurize battery laminate body 12 from both end surfaces, and fix each battery cell 1 of battery laminate body 12 in a pressurized state with a predetermined tightening pressure. End plate 13 has an outer shape substantially equal to the outer shape of battery cell 1, and bind bars 14 are coupled to both sides to fix battery laminate body 12 in a pressurized state and form a quadrangular plate that does not deform. End plate 13 is made of a material that exhibits sufficient strength, for example, metal. However, the end plate may be made of resin, or the end plate made of resin may be reinforced with a metal member.

(Bind Bar 14)

As shown in FIG. 4, bind bars 14 are disposed on both side surfaces of battery laminate body 12, and end plates 13 laminated on both ends of battery laminate body 12 are coupled to fix the plurality of battery cells 1 in a pressurized state in the laminating direction. Both ends of bind bar 14 in the figure are fixed to both side surfaces of end plate 13 via set screws 19. However, the bind bar can also be provided with bent pieces at both ends, and the bent pieces can be fixed to the outer surfaces of the end plates. End plate 13 to which bind bar 14 is fixed by set screws 19 is provided with female screw holes 13a on the side surface into which the set screws 19 are screwed. In end plate 13, set screws 19 penetrating bind bar 14 are screwed into female screw holes 13a on both side surfaces to couple bind bar 14.

Bind bar 14 is manufactured by processing a metal plate having a predetermined thickness into a predetermined width. The end of bind bar 14 is fixed to end plate 13, and battery laminate body 12 is fixed in a pressurized state by a pair of end plates 13. Bind bar 14 fixes the pair of end plates 13 in a predetermined size, and fixes battery cells 1 laminated therebetween in a predetermined pressurized state. When bind bar 14 expands due to the expansion pressure of battery cells 1, the expansion of battery cells 1 cannot be prevented. Therefore, bind bar 14 is manufactured by processing a metal plate having strength to withstand the expansion pressure of battery cells 1, such as a metal plate of a stainless plate such as SUS 304, a steel plate, and the like, into a width and thickness having sufficient strength. Furthermore, in the bind bar, a metal plate can be also processed into a groove shape. Since the bind bar having this shape can increase the bending strength, it has a feature that the laminated square batteries can be firmly fixed in a predetermined compressed state while the width is narrowed.

Bind bar 14 in the figure includes side surface plate 14A disposed on the side surface of battery laminate body 12. Bind bar 14 is provided with through holes for inserting set screws 19 at both ends of side surface plate 14A to form set holes 14a. Furthermore, bind bar 14 is provided with blower openings 14D inside side surface plate 14A except for the outer peripheral edge portion to form such a structure that the cooling gas can be blown into the inside of battery laminate body 12. End plate 13 in the figure is provided with openings at the center of side surface plate 14A and on both sides thereof to form blower openings 14D. By enlarging blower openings 14D of bind bar 14, the weight of bind bar 14 can be reduced, and the amount of metal used can be reduced to reduce the manufacturing cost. Furthermore, bind bar 14 in the figure is provided with upper surface side bent portion 14B for holding the upper surface of battery laminate body 12 along the upper end of the middle portion excluding both ends of side surface plate 14A, and includes lower surface side bent portion 14C for holding the lower surface of battery laminate body 12 along the lower end of the middle portion.

Battery block 10 having the above structure is stored in a fixed position of exterior case 2. Exterior case 2 shown in FIG. 3 stores four sets of battery blocks 10 in two rows and two columns. That is, two sets of battery blocks 10 are disposed in two rows in an orientation parallel to each other, and two sets of battery blocks 10 each disposed in parallel are arranged linearly in the longitudinal direction to store four sets of battery blocks in the exterior case by side in two rows and two columns. Two rows of battery blocks disposed in parallel are disposed apart from each other to provide a space therebetween, and blower duct 6 for blowing cooling gas to cooling gap 16 provided between the battery cells is disposed in the space between battery blocks 10.

(Exterior Case 2)

As shown in the exploded perspective view of FIG. 2, exterior case 2 has a box shape having a rectangular shape in a plan view. Exterior case 2 includes tubular case 20 in which upper case 22 is fixed to lower case 21 to form a tubular shape, a pair of end face plates 3 fixed to both ends of tubular case 20 to close the openings at both ends of tubular case 20, and partition walls 4 fixed to the middle portion of tubular case 20.

(Lower Case 21)

Figure 5:
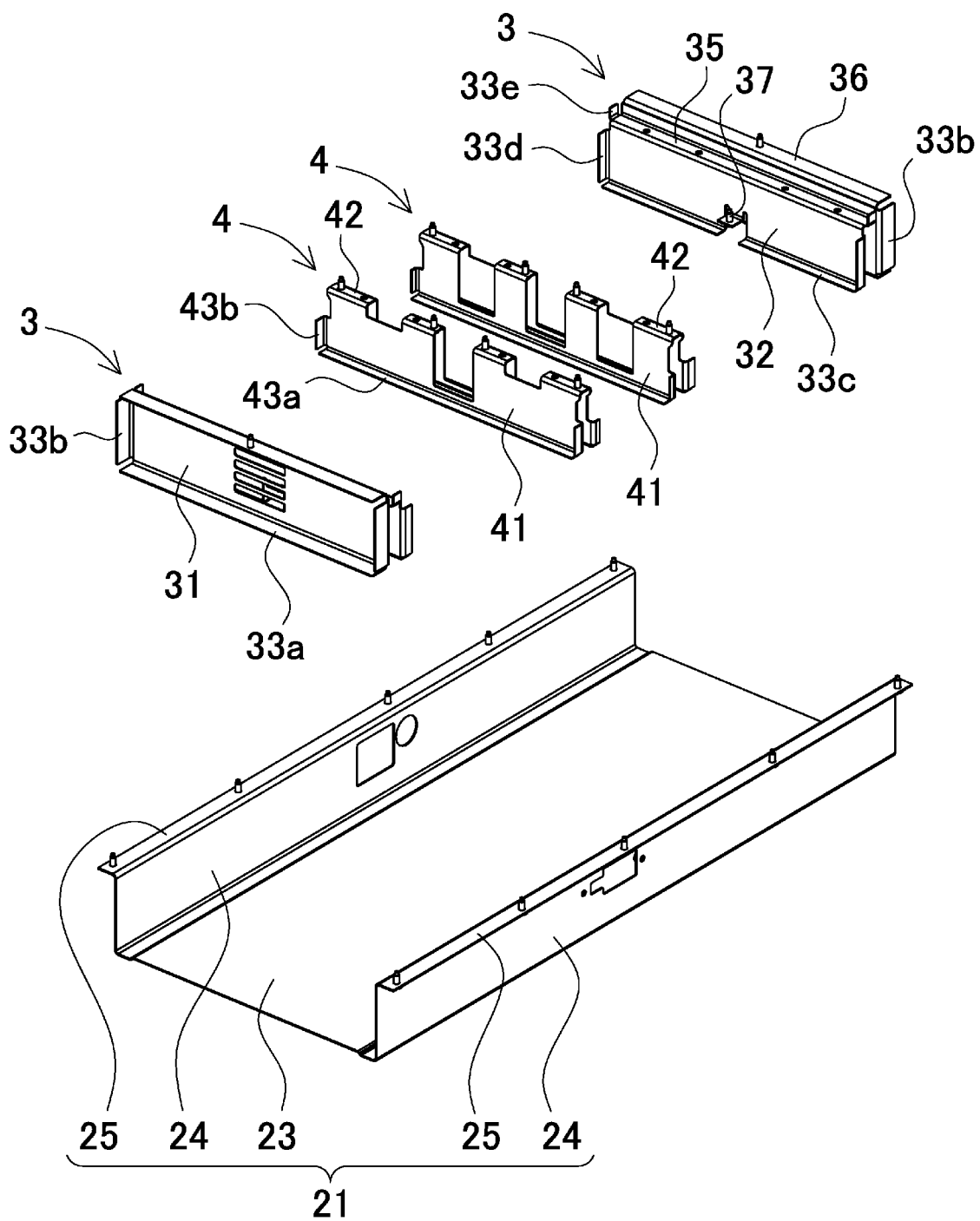
FIG. 5 is an exploded perspective view of an exterior case.

Lower case 21 is manufactured by pressing a metal plate so as to form a groove extending in one direction. Lower case 21 in FIG. 5 is formed in a groove shape in which side walls 24 are coupled to both sides of bottom plate 23, coupling ribs 25 are coupled to the upper end edge of side walls 24, and the cross section at each portion separated in the longitudinal direction has the same shape. Furthermore, groove-shaped lower case 21 is processed so as to have total length (L) that can store a predetermined number of battery blocks 10. In this way, the structure having high side walls 24 provided on both sides of bottom plate 23 can reinforce bottom plate 23 with side walls 24 to achieve strong exterior case 2. Furthermore, by providing coupling ribs 25 on the upper end edge of side walls 24, it is also possible to increase the strength of side walls 24 and improve the bending strength of a whole of lower case 21 to obtain a sturdy structure.

(Upper Case 22)

Upper case 22 is manufactured by pressing a metal plate so as to have lid 26 having a groove shape shallower than that of lower case 21. In tubular case 20 of FIG. 2, since upper case 22 has a shallow groove shape and lower case 21 has a deep groove shape, heavy battery blocks 10 can be stored and fixed in deep lower case 21 to make exterior case 2 sturdy. However, the whole of the upper case can be made flat without providing a groove-shaped lid.

Furthermore, upper case 22 shown in FIG. 2 is provided with flange 27 along the outer periphery of lid 26. Lower case 21 and upper case 22 form tubular case 20 having a quadrangular shape in a cross-sectional view in a state that coupling ribs 25 protruding on both sides of lower case 21 and flange 27 protruding on both sides of upper case 22 are coupled. Tubular case 20 has a tubular shape as a whole by fixing these connecting ribs 25 and flange 27 with couplers such as bolts and nuts.

(End Face Plate 3)

Figure 6:
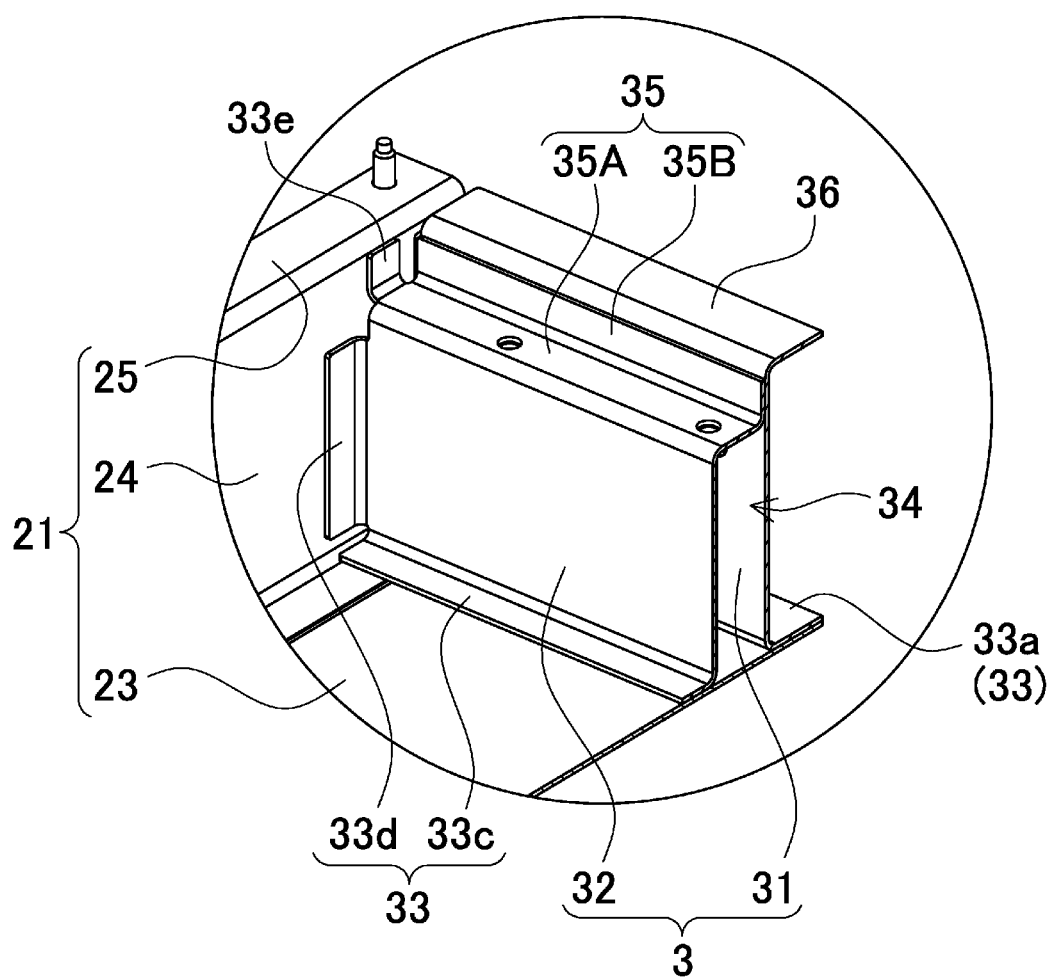
FIG. 6 is an enlarged cross-sectional perspective view of a main part showing an end face plate of the exterior case.

As shown in FIG. 2, FIG. 5, and FIG. 6, end face plates 3 are fixed to both ends of tubular case 20 to close the openings at both ends of tubular case 20. End face plate 3 is configured by metal plates having a multi-layer structure, and is provided with weld pieces 33 that come into surface contact with the inner surface of lower case 21 on the lower edge and both side edges of each metal plate. End face plate 3 shown in the figure is configured by two metal plates including outer metal plate 31 located on the outer side and inner metal plate 32 located on the inner side. Outer metal plate 31 and inner metal plate 32 are coupled in a welded structure at the upper ends, and have a multi-layer structure in which gap 34 is provided between inner metal plate 32 and outer metal plate 31 facing each other.

(Outer Metal Plate 31)

Outer metal plate 31 has a quadrangular shape sized to close the opening of tubular case 20, and is provided with weld piece 33 that come into surface contact with the inner surface of lower case 21 along the lower edge and both side edges. Outer metal plate 31 shown in the figure is formed as welded piece 33 by providing bent pieces, which are bent at a right angle in the outward direction along the inner surface of lower case 21, on the lower edge and both side edges. Weld piece 33*a* provided on the lower edge of outer metal plate 31 is disposed in close contact with the inner surface of bottom plate 23 of lower case 21, and is welded and fixed to the inner surface of bottom plate 23. Weld pieces 33*b* provided on both side edges of outer metal plate 31 are disposed in close contact with the inner surface of side walls 24 of lower case 21, and are welded and fixed to the inner surface of side walls 24.

Furthermore, outer metal plate 31 shown in the figure is formed as coupling piece 36 by providing bent pieces, which are bent at a right angle in the outward direction along flange 27 of upper case 22, along the upper edge. Coupling pieces 36 are connected to flanges 27 provided at both ends of upper case 22 in the longitudinal direction, and the openings at both ends of tubular case 20 are closed. Coupling pieces 36 of end face plate 3 and flanges 27 of upper case 22 are fixed by couplers such as bolts and nuts. In this way, both ends of lower case 21 are coupled to upper case 22 via end face plate 3 welded to lower case 21.

(Inner Metal Plate 32)

Inner metal plate 32 is coupled to the inside of outer metal plate 31, and provided with weld pieces 33 that come into surface contact with the inner surface of lower case 21 along the lower edge and both side edges. Inner metal plate 32 shown in the figure is formed as welded piece 33 by providing bent pieces, which are bent at a right angle in the inner direction along the inner surface of lower case 21, on the lower edge and both side edges. Weld piece 33*c* provided on the lower edge of inner metal plate 32 is disposed in close contact with the inner surface of bottom plate 23 of lower case 21, and is welded and fixed to the inner surface of bottom plate 23. Weld pieces 33*d* provided on both side edges of inner metal plate 32 are disposed in close contact with the inner surfaces of side walls 24 of lower case 21, and are welded and fixed to the inner surface of side walls 24.

Furthermore, inner metal plate 32 has upper edge rib 35 formed by bending at a right angle along the upper edge. Upper edge rib 35 couples horizontal rib 35A to sub-welded piece 35B at a right angle to form an L-shape in a cross-sectional view. Upper edge rib 35 couples one side edge of horizontal rib 35A to the upper edge of inner metal plate 32 at a right angle, and couples the other side edge to sub-welded piece 35B. In inner metal plate 32 having this shape, sub-welded piece 35B is welded and fixed to the inner surface of the upper end of outer metal plate 31. In inner metal plate 32, sub-welded piece 35B of upper edge rib 35 is fixed to outer metal plate 31, so that gap 34 having a distance corresponding to the width of horizontal rib 35A is formed between inner metal plate 32 and outer metal plate 31.

Furthermore, horizontal rib 35A of upper edge rib 35 is provided with weld pieces 33*e* that come into surface contact with the inner surface of lower case 21 along both side edges. Horizontal rib 35A shown in the figure is formed with welded pieces 33e by providing bent pieces, which are bent at a right angle in the upward direction along the inner surface of lower case 21, on both side edges. Weld pieces 33e provided on both side edges of horizontal rib 35A are disposed in close contact with the inner surfaces of side walls 24 of lower case 21, and are welded and fixed to the inner surfaces of the side walls 24.

In end face plate 3 having the above structure, outer metal plate 31 and inner metal plate 32 are formed into predetermined shapes by pressing a metal plate. That is, outer metal plate 31 is pressed to form weld pieces 33a and 33b on the lower edge and both side edges, and coupling piece 36 on the upper edge. In addition, inner metal plate 32 is pressed to form weld pieces 33c and 33d on the lower edge and both side edges, and upper edge rib 35 on the upper edge. In upper edge rib 35, sub-welded piece 35B and weld pieces 33e are formed for horizontal rib 35A by pressing. Furthermore, by welding and fixing sub-welded piece 35B of inner metal plate 32 to the upper end of the inner side surface of outer metal plate 31, end face plate 3 having a multilayer structure composed of inner metal plate 32 and outer metal plate 31 is formed.

Above end face plate 3 can be manufactured of a metal plate having a thickness different from that of lower case 21. In exterior case 2, for example, by making end face plate 3 thicker than lower case 21, both ends of exterior case 2 can be reinforced more strongly, and conversely, by making end face plate 3 thinner than lower case 21, the resonance frequency and the bending state of exterior case 2 can be adjusted to control the characteristics of exterior case 2 to absorb the impact. In this way, in exterior case 2, by adjusting the thicknesses of lower case 21 and end face plate 3, it is possible to design the bending strength of exterior case 2 in the three-dimensional direction in an optimum state and reduce the harmful effects of vibration and deformation provided to battery block 10.

(Partition Wall 4)

Figure 7:
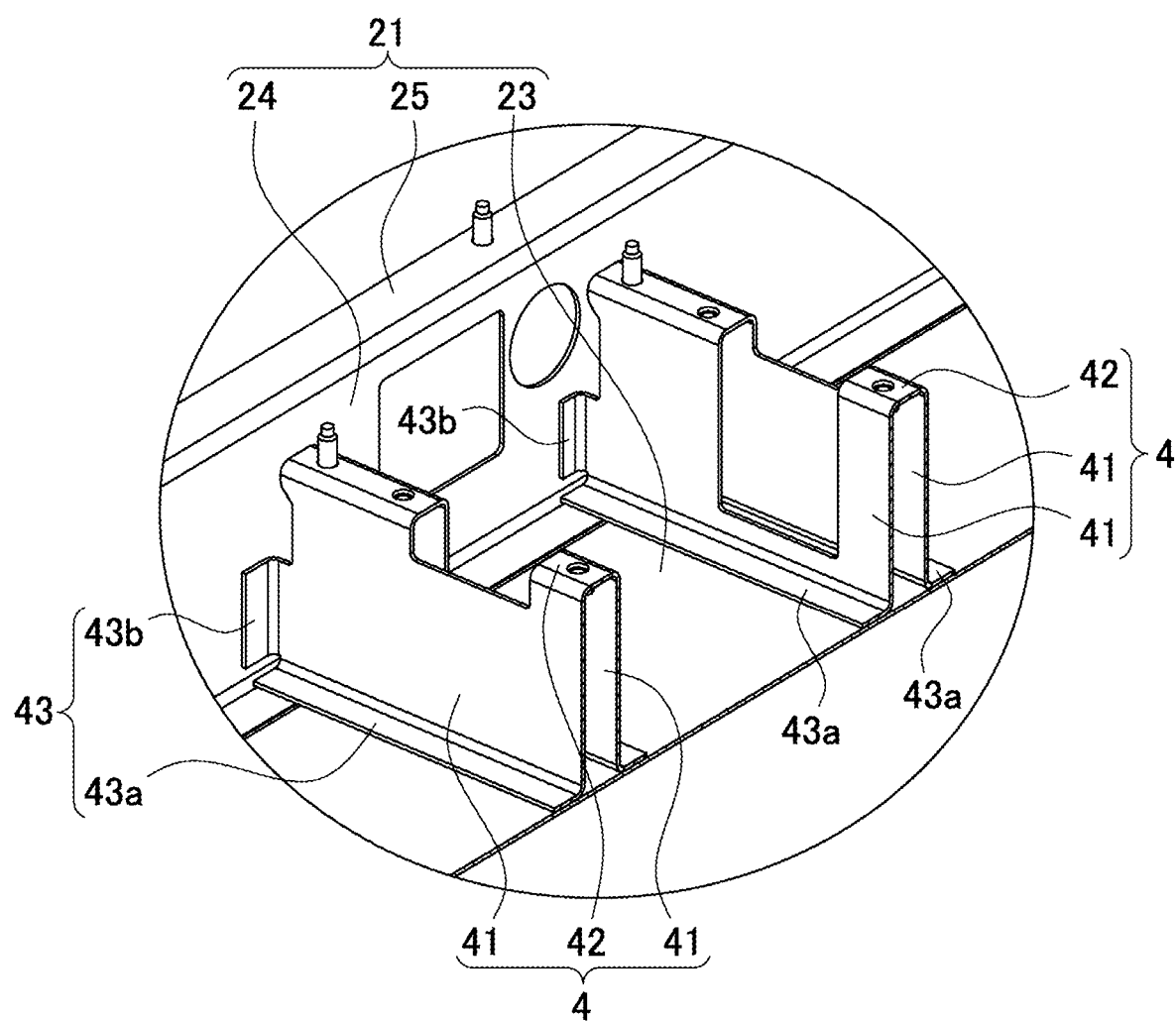
FIG. 7 is an enlarged cross-sectional perspective view of a main part showing partition walls of the exterior case.

As shown in FIG. 2, FIG. 5, and FIG. 7, partition walls 4 are fixed to the middle portion of tubular case 20 to partition the inside of tubular case 20 into a plurality of areas. Partition wall 4 has a groove shape formed by coupling the upper edges of two vertical walls 41 with horizontal plate 42. Partition wall 4 is provided with weld pieces 43 on the lower edge and both side edges of each vertical wall 41. Vertical wall 41 shown in the figure is formed with welded piece 43 by providing bent pieces, which are bent at a right angle along the inner surface of lower case 21, on the lower edge and both side edges. Weld pieces 43 also have a structure in which they come into surface contact with the inner surface of lower case 21. Weld piece 43a provided on the lower edge of vertical wall 41 is disposed in close contact with the inner surface of bottom plate 23 of lower case 21, and is welded and fixed to the inner surface of bottom plate 23. Weld pieces 43b provided on both side edges of vertical wall 41 are disposed in close contact with the inner surface of side walls 24 of lower case 21, and are welded and fixed to the inner surface of side walls 24. In partition wall 4 having the above structure, vertical wall 41 and horizontal plate 42 are formed into predetermined shapes and weld pieces 43a and 43b are formed on the lower edge and both side edges of vertical wall 41, by pressing a metal plate.

As shown in FIG. 2, partition walls 4 are disposed and fixed in the middle portion of tubular case 20. In exterior case 2 of FIG. 2, two rows of partition walls 4 are fixed to the middle portion of lower case 21, and board space 29 is provided between the two rows of partition walls 4. Battery system 100 includes circuit board 9 connected to battery block 10, and various electronic components (not shown) connected to circuit board 9 and battery block 10 are disposed in board space 29. In this way, the wiring between each battery block 10 and circuit board 9 can be made the shortest distance in the structure in which board space 29 is provided in the central portion of exterior case 2 and circuit board 9 is disposed. With this, the wiring work can be simplified, the power loss can be reduced, and further, the influence of noise can be reduced. Furthermore, since circuit board 9 can be shielded by partition walls 4 on both sides, there is also such a feature that the adverse effect due to noise on circuit board 9 can be reduced.

Partition wall 4 in FIG. 2 is provided with notch 44 in the middle portion, and notch 44 serves as a positioning portion for members disposed in board space 29 of exterior case 2. In partition walls 4 shown in the figure, notch 44 provided in the middle portion is used as a positioning portion of blower duct 6 disposed between battery blocks 10. That is, by guiding blower duct 6 to notch 44, blower duct 6 is disposed at a fixed position of exterior case 2.

Partition walls 4 described above can be manufactured of a metal plate having a thickness different from that of lower case 21. In exterior case 2, for example, by making partition walls 4 thicker than lower case 21, the central portion of exterior case 2 can be reinforced more strongly, and conversely, by making partition walls 4 thinner than lower case 21, the resonance frequency and the bending state of exterior case 2 can be adjusted to control the characteristics of exterior case 2 to absorb the impact. In this way, by adjusting the thicknesses of lower case 21 and partition walls 4, exterior case 2 optimally designs the bending strength in the three-dimensional direction in the central portion of exterior case 2 and the harmful effects of vibration and deformation on battery block 10 can be reduced.

In exterior case 2 described above, two rows of partition walls 4 are disposed and fixed in the middle portion of tubular case 20, and end face plates 3 are disposed and fixed at both ends of tubular case 20, respectively. Exterior case 2 forms battery storages 28 that form board space 29 between two sets of partition walls 4 disposed in the middle portion and stores battery blocks 10 between partition walls 4 and end face plates 3. Battery storages 28 are both end portions in the longitudinal direction of exterior case 2, and are formed in regions outside the two rows of partition walls 4, respectively. As shown in FIG. 2 and FIG. 3, exterior case 2 stores two sets of battery blocks 10 to be disposed side by side in parallel in the respective battery storages.

End face plates 3 and partition walls 4 described above are provided with weld pieces 33 and 43 that come into surface contact with the inner surface of lower case 21 while being moved in the longitudinal direction of lower case 21. In other words, end face plates 3 and partition walls 4 are in such a structure that end face plates 3 and partition walls 4 can slide in the longitudinal direction of lower case 21 while outer metal plate 31 and inner metal plate 32, or welded pieces 33 and 43 provided on the lower edge and both side edges of vertical wall 41 come into surface contact with the inner surface of lower case 21. End face plates 3 and partition walls 4 of this structure can be disposed, welded and fixed to groove-shaped lower case 21 while their connecting positions are adjusted. Lower case 21 has a groove shape having the same cross-sectional shape at each portion separated in the longitudinal direction. Therefore, the fixed position can be changed while end face plates 3 and partition walls 4 are slid with respect to lower case 21 in this shape, and further, weld pieces 33 and 43 are disposed and welded in a surface contact state with respect to the inner surface of lower case 21.

Figure 8:
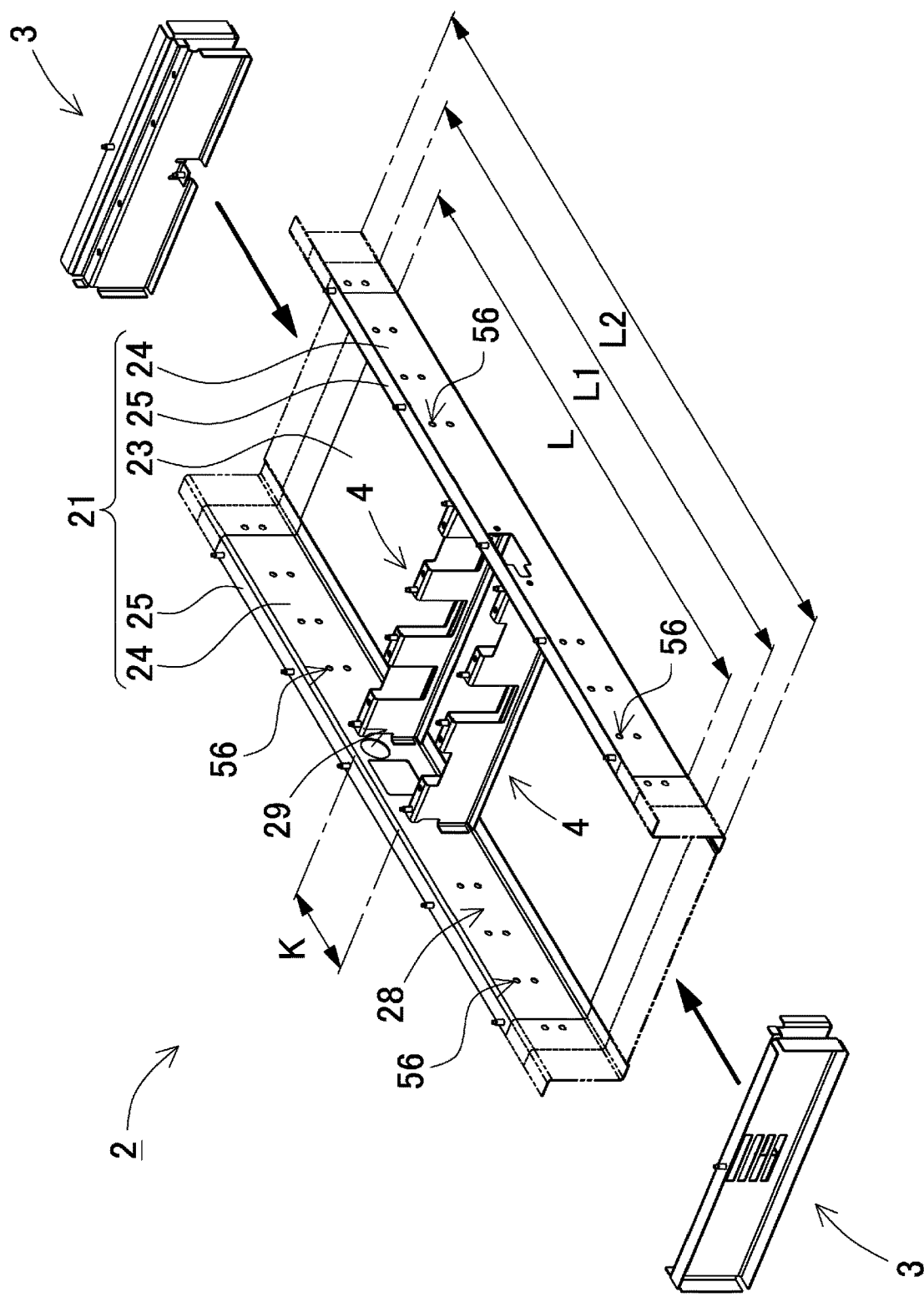
FIG. 8 is an exploded perspective view showing another example of the exterior case.

In exterior case 2 having this structure, while changing the total length of lower case 21 according to the vehicle model of the vehicle on which battery system 100 is mounted, end face plates 3 and partition walls 4 can be fixed at the optimum positions for battery block 10 and circuit board 9 to be stored to ideally store and fix battery block 10. FIG. 8 shows an example in which the total length of lower case 21 is changed according to the vehicle model. In lower case 21 shown in FIG. 8, total length (L) of lower case 21 shown in FIG. 5 is shown by a solid line, the state in which total length (L1) is longer than this is shown by a chain line, and the state in which total length (L2) is further increased is shown by a two-dot chain line. In the case of lower case 21, it is possible to press lower case 21 using the same mold by making the cross-sectional shape in the longitudinal direction the same shape, and it is possible to mass-produce exterior case 2 with the optimum outer shape for the vehicle mounting battery system 100 at low cost by changing the total length according to the vehicle model. In lower case 21 having a different total length, it is possible to arrange end face plates 3 at optimum positions by moving end face plates 3 along the inner surface thereof, and further to fix end face plates 3 at desired positions of lower case 21 by welding welded pieces 33 disposed in a surface contact state on the inner surface of lower case 21.

Exterior case 2 of FIG. 8 shows an example in which distance (K) between the two rows of partition walls 4 is a constant distance, and the distances between partition walls 4 and end face plates 3 are changed by changing the total length of lower case 21 to adjust the total length of battery storage 28 so as to have an optimum distance for battery block 10 to be stored. However, in the exterior case, distance (K) between the two rows of partition walls 4 can also be changed in various ways.

(Blower Duct 6)

Furthermore, battery system 100 has such a structure that blower duct 6 is disposed inside exterior case 2 and cooling gas is supplied from the outside via blower duct 6 in order to dissipate heat from each battery cell 1 of battery block 10 stored in exterior case 2. Blower duct 6 shown in FIG. 2 and FIG. 3 includes inhaler 63 for supplying the cooling gas supplied from the outside into the inside of exterior case 2, brancher 62 that branches the cooling gas supplied from inhaler 63 in two directions, and blower guide 61 coupled to both sides of brancher 62 and disposed between battery blocks 10 adjacent to each other. Inhaler 63 is coupled to a blower fan (not shown) disposed outside, and the cooling gas is forcibly supplied from the outside. Blower guide 61 has a frame shape that is open to the side surface of battery block 10, and is disposed between battery blocks 10 disposed in two rows. Inhaler 63, brancher 62, and blower guide 61 are communicated with each other via blower passage 64 provided inside, so that the cooling gas supplied from the outside can be supplied from blower guide 61 to cooling gap 16 of battery block 10. In blower duct 6 shown in the figure, inhaler 63 penetrates side wall 24 at the center of lower case 21 to dispose brancher 62 in board space 29, and blower guide 61 coupled to the tip of brancher 62 is disposed inside battery storage 28, and is disposed between battery blocks 10 disposed in two rows. In blower duct 6, the tip of brancher 62 is guided by notch 44 provided in partition wall 4, and the tip of blower guide 61 is coupled to coupler 37 provided in end face plate 3 to dispose it in a fixed position of battery storage 28.

(External Fixing Bracket 5)

Figure 9:
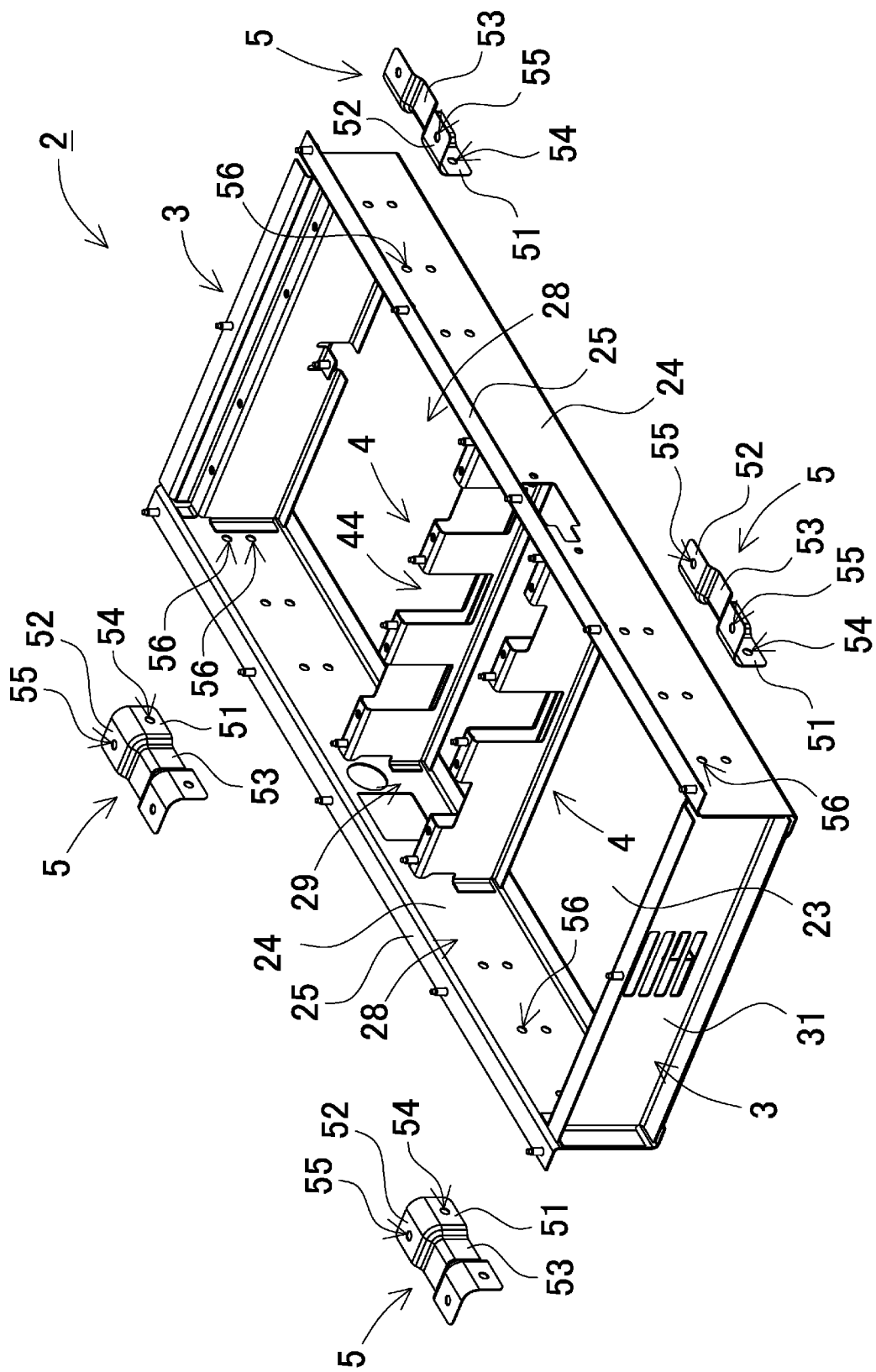
FIG. 9 is a perspective view showing the exterior case and an external fixing bracket.

As described above, battery system 100 in which the plurality of battery blocks 10 are stored in the fixed positions inside exterior case 2 is fixed to the vehicle via external fixing brackets 5. External fixing bracket 5 shown in FIG. 9 has a shape in which first coupler 51 and second coupler 52 made of a metal plate are coupled in an L shape. Furthermore, external fixing bracket 5 shown in the figure is provided with intermediate step 53 in the intermediate portion between first coupler 51 and second coupler 52 to improve the bending rigidity. External fixing bracket 5 is provided with coupling holes 54 for coupling to exterior case 2 of battery system 100 by opening those in first coupler 51. In addition, external fixing bracket 5 is provided with fixing hole 55 for fixing to the vehicle by opening those in second coupler 52.

Figure 10:
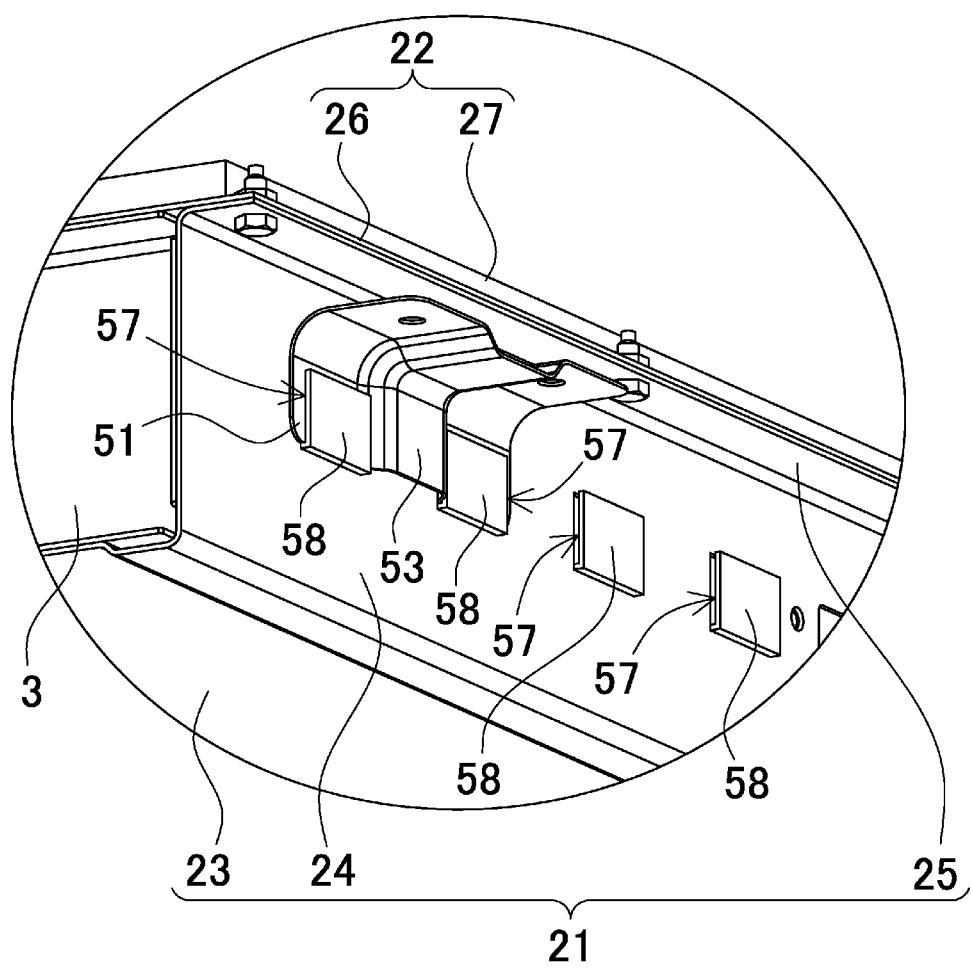
FIG. 10 is a bottom perspective view showing another coupling structure of the exterior case and the external fixing bracket.

In above external fixing bracket 5, first coupler 51 is coupled to exterior case 2 of battery system 100. Lower case 21 shown in FIG. 10 has a plurality of coupling holes 56 opened at predetermined intervals on side walls 24. The opening pitch of the plurality of coupling holes 56 is equal to the opening pitch of coupling holes 54 provided in first coupler 51 of external fixing bracket 5. With this, external fixing bracket 5 and lower case 21 can be coupled to the optimum position while the coupling position therebetween is selected. Thus, the coupling position between exterior case 2 and external fixing bracket 5 can be arbitrarily selected according to the mounting position on the vehicle side. Although not shown, external fixing bracket 5 can be coupled via couplers such as bolts and nuts. Specifically, nuts are screwed into bolts inserted through coupling holes 56 and coupling holes 54, and external fixing bracket 5 is coupled to side wall 24 of lower case 21. As shown in FIG. 10, a plurality of external fixing brackets 5 are fixed on both sides of exterior case 2.

Figure 11:
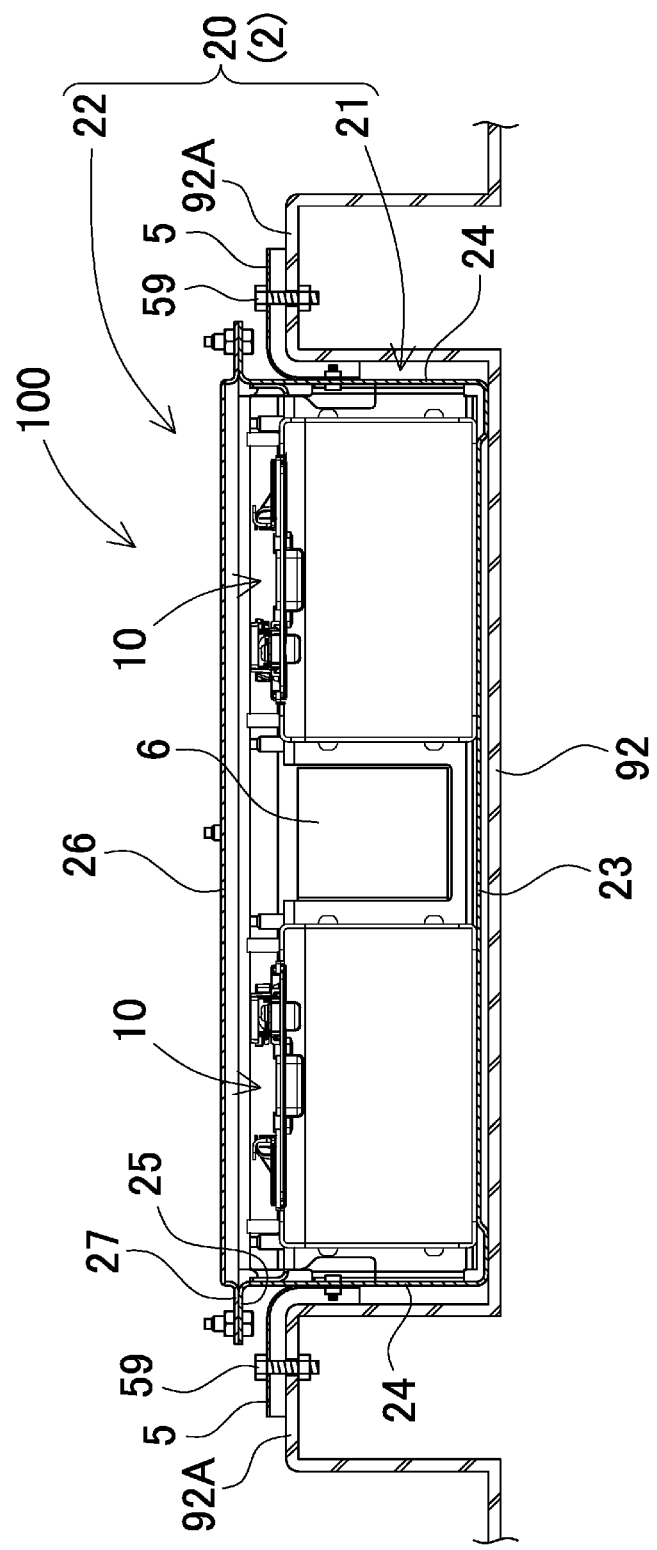
FIG. 11 is a cross-sectional view showing an example of fixing the battery system to a vehicle.

Furthermore, in lower case 21, as shown in FIG. 11, the fixing position of external fixing bracket 5 can also be specified by the fitting structure. Lower case 21 shown in this figure is provided with fitting portions 57 for guiding first coupler 51 of external fixing bracket 5 on the outer side surface of side wall 24. Lower case 21 shown in the figure is provided with coupling plate 58 in which side wall 24 is partially cut out and protrudes outward. Coupling plate 58 has a quadrangular shape and is separated from side wall 24 by cutting three sides excluding the lower side. Coupling plate 58 is extruded outward in a state of forming a predetermined gap with respect to side wall 24, and a gap for inserting first coupler 51 of external fixing bracket 5 is provided between coupling plate 58 and side wall 24 to form fitting portion 57. Lower case 21 shown in FIG. 11 is provided with a plurality of fitting portions 57 separated from each other in the longitudinal direction. The distance between the plurality of fitting portions 57 is set so as to be equal to the width of intermediate step 53 provided in first coupler 51 of external fixing bracket 5. With this, it is possible to insert both ends of first coupler 51 into fitting portions 57 while the intermediate step portion is guided between adjacent fitting portions 57, and to couple external fixing bracket 5 to side wall 24 of lower case 21. According to this structure, external fixing bracket 5 and lower case 21 can be coupled to the optimum position while the coupling position of external fixing bracket 5 and lower case 21 is selected.

Battery system 100 described above is disposed at a fixed position of the vehicle and is fixed to the vehicle via external fixing brackets 5. Battery system 100 is, for example, fixed in a space under the seat in chassis 92 of the vehicle, as shown in FIG. 11. Chassis 92 shown in FIG. 11 has protrusions 92A protruding from the upper surface and extending in parallel with each other, and battery system 100 is disposed between adjacent protrusions 92A. In battery system 100, external fixing brackets 5 fixed to exterior case 2 are fixed to protrusions 92A via the fixtures 59. Battery system 100 is fixed to chassis 92 via a plurality of external fixing brackets 5 fixed to both sides of lower case 21. Battery system 100 can be mounted on the vehicle in a horizontal orientation with the longitudinal direction as the front-rear direction of the vehicle, or can be mounted on the vehicle in a horizontal orientation with the longitudinal direction as the width direction of the vehicle.

Chassis 92 of the vehicle increases the rigidity as a whole by pressing a metal plate to provide a plurality of protrusions 92A, but the strength is not increased by the whole chassis made into one rigid body so as not to be deformed by impact or vibration, and by constructing a structure that allows some twisting and deformation depending on the driving condition and road surface condition of the vehicle, it is possible to achieve excellent strength as a whole while absorbing impact and vibration during driving. Therefore, it is important that battery system 100 fixed to chassis 92 is placed in a fixed position without deteriorating such characteristics of chassis 92. In above battery system 100, exterior case 2 is not directly fixed to chassis 92, but is fixed to chassis 92 via external fixing bracket 5 which is a separate part from exterior case 2, so that it is possible to adjust the position of fixing external fixing bracket 5 to exterior case 2 and fix exterior case 2 to chassis 92 of the vehicle in the optimum state in consideration of the vibration, deformation, resonance frequency, and the like of the exterior case.

Furthermore, in battery system 100, lower case 21 and external fixing bracket 5 can be made of metal plates having different thicknesses. In battery system 100, while lower case 21 is made of a metal plate having an optimum thickness such that a plurality of battery blocks 10 are fixed to exterior case 2 to achieve sufficient strength, a metal plate having an optimum thickness, which can prevent exterior case 2 fixing the heavy battery blocks from vibrating and deforming, and can effectively prevent the harmful effects of resonance, is used for external fixing bracket 5 that fixes battery system 100 to the vehicle.

(Vehicle with Battery System)

The above battery system is most suitable as a power source for supplying electric power to a motor for driving a vehicle. As a vehicle with a battery system, a hybrid vehicle or a plug-in hybrid vehicle that runs on both an engine and a motor, an electric vehicle that runs only on a motor, and the like can be used, and the battery system is used as a power source for these vehicles. It should be noted it is also possible to construct and mount a large-capacity, high-output power supply device by connecting a large number of the above-mentioned battery systems in series or in parallel and further adding necessary control circuits in order to obtain the electric power to drive the vehicle.

(Battery System for Hybrid Vehicle)

Figure 12:
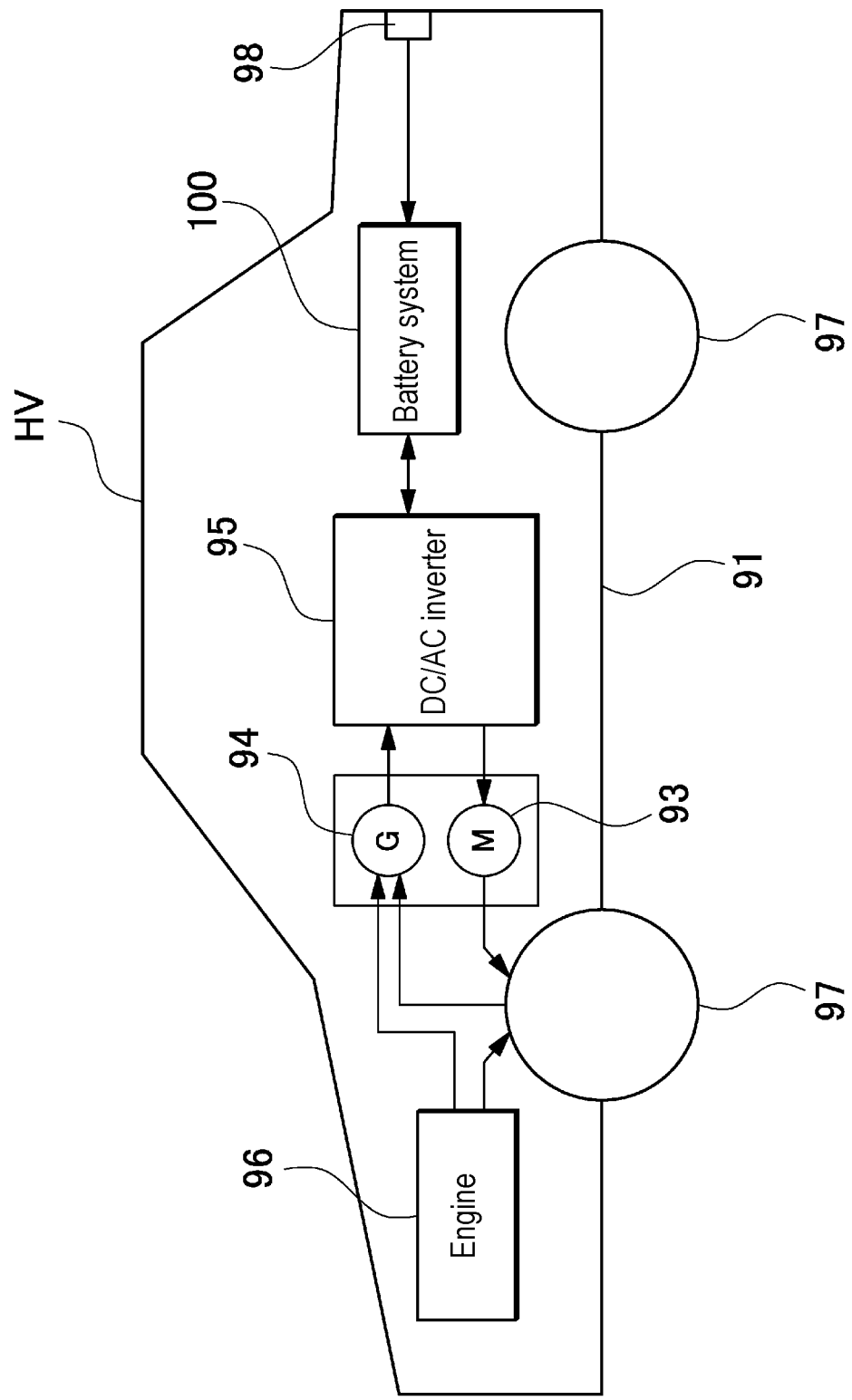
FIG. 12 is a block diagram showing an example in which the battery system is mounted on a hybrid vehicle that runs on an engine and a motor.

FIG. 12 shows an example in which a battery system is installed in a hybrid vehicle that runs on both an engine and a motor. Vehicle HV with battery system 100 shown in this figure includes engine 96 and driving motor 93 for driving vehicle HV, battery system 100 for supplying electric power to motor 93, electric power generator 94 for charging the battery cells of battery system 100, vehicle body 91 that mounts engine 96, motor 93, battery system 100, and electric power generator 94, and wheels 97 driven by engine 96 or motor 93 to drive vehicle body 91. Battery system 100 is connected to motor 93 and electric power generator 94 via the DC/AC inverter 95. Vehicle HV runs on both motor 93 and engine 96 while charging and discharging the battery cells of battery system 100. Motor 93 is driven to drive the vehicle in a region where the engine efficiency is low, for example, when accelerating or driving at a low speed. Motor 93 is driven by being supplied with electric power from battery system 100. Electric power generator 94 is driven by engine 96 or by regenerative braking when braking the vehicle to charge the batteries of battery system 100. In addition, vehicle HV shown in the figure is provided with charging plug 98, and charging plug 98 can be connected to an external power source to charge battery system 100.

(Battery System for Electric Vehicle)

Figure 13:
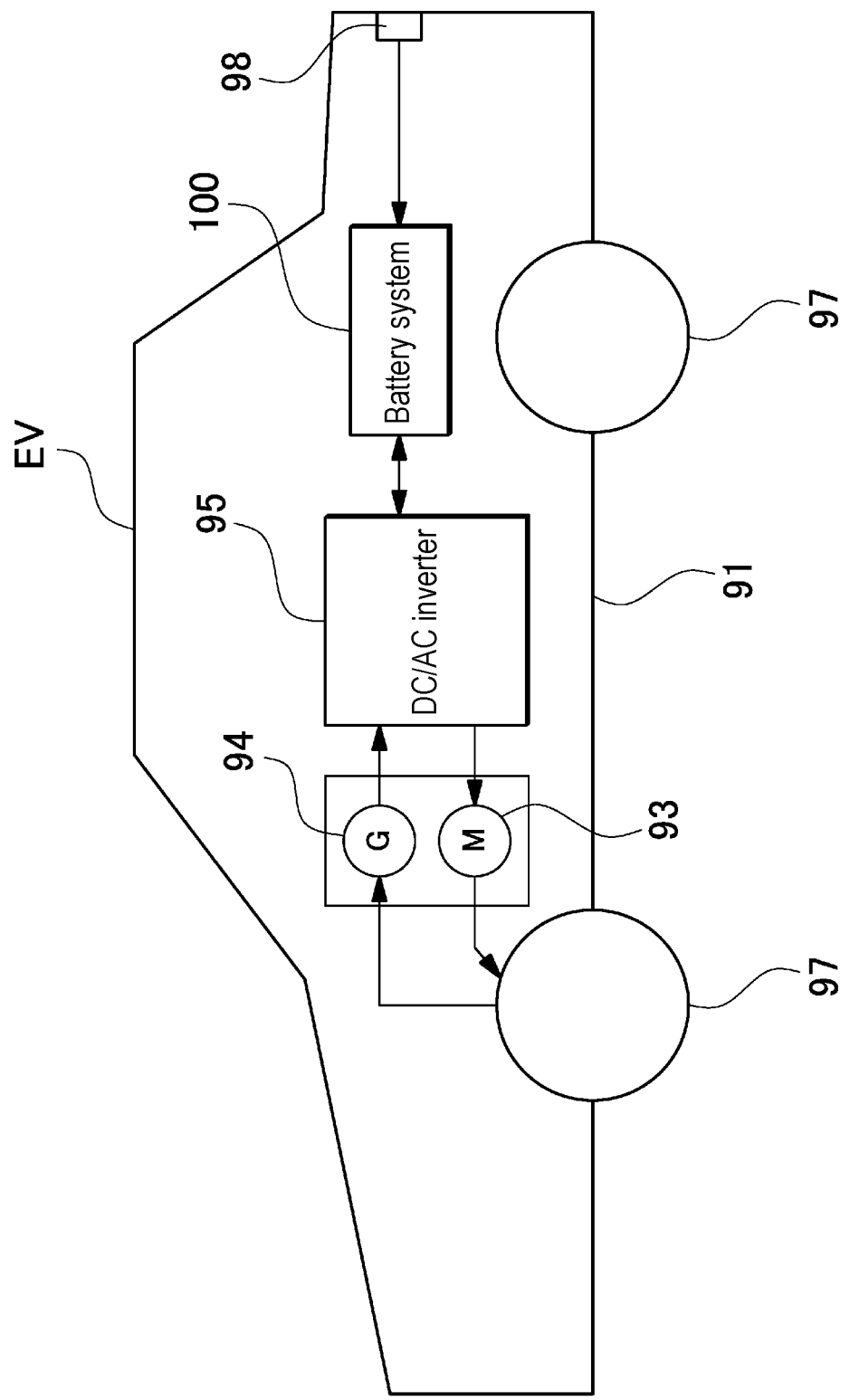
FIG. 13 is a block diagram showing an example in which the battery system is mounted on an electric vehicle that runs only on a motor.

In addition, FIG. 13 shows an example in which a battery system is mounted on an electric vehicle that runs only by a motor. Vehicle EV provided with battery system 100 shown in this figure includes driving motor 93 for driving vehicle EV, battery system 100 for supplying power to motor 93, electric power generator 94 for charging battery cells of battery system 100, vehicle body 91 mounting motor 93, battery system 100, and electric power generator 94, and wheels 97 driven by motor 93 to drive vehicle body 91. Battery system 100 is connected to motor 93 and electric power generator 94 via DC/AC inverter 95. Motor 93 is driven by being supplied with electric power from battery system 100. Electric power generator 94 is driven by the energy used for regenerative braking of vehicle EV to charge the battery cells of battery system 100. In addition, vehicle EV shown in the figure is provided with charging plug 98, and charging plug 98 can be connected to an external power source to charge battery system 100.

INDUSTRIAL APPLICABILITY

The vehicle battery system according to the present invention can be suitably used as a battery system for a plug-in hybrid electric vehicle and a hybrid electric vehicle, which can switch between an EV driving mode and a HEV driving mode, an electric vehicle, or the like.

REFERENCE MARKS IN THE DRAWINGS 100 battery system
1 battery cell
2 exterior case
3 end face plate
4 partition wall
5 external fixing bracket
6 blower duct
9 circuit board
10 battery block
11 electrode terminal
12 battery laminate body
13 end plate
13a female screw hole
14 bind bar
14A side plate portion
14a set hole
14B upper surface side bent portion
14C lower surface side bent portion
14D blower opening
15 separator
15A groove
16 cooling gap 17 bus bar
19 set screw
20 tubular case
21 lower case
22 upper case
23 bottom plate
24 side wall
25 coupling rib
26 lid
27 flange
28 battery storage
29 board space
31 outer metal plate
32 inner metal plate
33, 33a, 33b, 33c, 33d, 33e welded piece
34 gap
35 upper edge rib
35A horizontal rib
35B sub-welded piece
36 coupling piece
37 coupler
41 vertical wall
42 horizontal plate
43, 43a, 43b welded piece
44 notch
51 first coupler
52 second coupler
53 intermediate step
54 coupling hole
55 fixing hole
56 coupling hole
57 fitter fitting portion
58 coupling plate
59 fixture
61 blower guide
62 brancher
63 Inhaler
64 blower passage
91 vehicle body
92 chassis
92A protrusion
93 motor
94 electric power generator
95 DC/AC inverter
96 engine
97 wheel
98 charging plug
HV vehicle
EV vehicle

The invention claimed is:

1. A vehicle battery system comprising:
a plurality of battery blocks each including one or more battery cells; and
an exterior case that stores the plurality of battery blocks, wherein
the exterior case includes:
a tubular case including an upper case and a lower case which are fixed to each other to have a tubular shape,
a pair of end face plates that are fixed to both ends of the tubular case to close openings at the both ends of the tubular case, and
one or more partition walls that are fixed to a middle portion of the tubular case,
wherein
the lower case, the upper case, the end face plates, and the partition walls each include a pressed metal plate,
the lower case comprises:
a bottom plate,
a pair of side walls coupled to both sides of the bottom plate, and
coupling ribs coupled to respective upper end edges of the side walls,
wherein the bottom plate, the pair of side walls, and the coupling ribs together form a groove shape extending in a longitudinal direction of the tubular case,
each of the pair of end face plates is provided separately from the lower case, and comprises:
an end face wall,
a bottom welded piece on a lower edge of the end face wall, the bottom welded piece disposed in surface contact with, and welded onto, an inner surface of the bottom plate of the lower case facing an interior of the groove shape, and
a pair of side welded pieces at both side edges of the end face wall, each of the pair of side welded pieces disposed in surface contact with, and welded onto, an inner surface of a corresponding one of the pair of side walls of the lower case facing the interior of the groove shape,
the plurality of battery blocks are disposed in an orientation extending in the longitudinal direction of the tubular case, and fixed to the exterior case, and
the exterior case is further fixed to a vehicle,
wherein each of the pair of end face plates includes multiple metal plates together forming a multi-layered structure, and
each of the multiple metal plates is provided separately from the lower case, and comprises the end face wall, the bottom welded piece, and the pair of side welded pieces,
the multiple metal plates together forming the multi-layered structure include an outer metal plate positioned outside and an inner metal plate positioned inside,
upper ends of the outer metal plate and the inner metal plate are coupled by a welded structure, and
each of the outer metal plate and the inner metal plate is provided separately from the lower case, and comprises the end face wall, the bottom welded piece, and the pair of side welded pieces.

2. The vehicle battery system according to claim 1, wherein the lower case and the end face plates are metal plates having different thicknesses.

3. The vehicle battery system according to claim 1, wherein the lower case and the partition walls are metal plates having different thicknesses.

4. The vehicle battery system according to claim 1, wherein the upper case is a flat metal plate or the upper case is a groove-shaped metal plate shallower than the lower case.

5. The vehicle battery system according to claim 1, wherein each of the end face plates includes a gap between the multiple metal plates together forming the multi-layered structure.

6. The vehicle battery system according to claim 1, wherein
the inner metal plate has an upper edge rib extending along an upper edge thereof, the upper edge rib being made by bending,
the upper edge rib comprises a horizontal rib and a sub-welded piece coupled in a right angle to together form an L-shape, the horizontal rib has one side edge coupled to the upper edge of the inner metal plate at a right angle, and another side edges coupled to the sub-welded piece, and the sub-welded piece is welded to an inner surface of the outer metal plate.

7. The vehicle battery system according to claim 1, further comprising a circuit board connected to the battery blocks, wherein the partition walls are disposed and fixed in two rows in a middle of the tubular case, and provides a board space between the two rows of the partition walls, and the circuit board is disposed in the board space.

8. The vehicle battery system according to claim 1, wherein the partition walls each have a groove shape made by coupling upper edges of two vertical walls with a horizontal plate, and the partition walls each has welded pieces on a lower edge and both side edges, the welded pieces on the lower edge are welded to the bottom plate of the lower case, and the welded pieces on the both side edges are welded to the side walls of the lower case.

9. The vehicle battery system according to claim 1, further comprising:

external fixing brackets connected to the exterior case to fix the exterior case to the vehicle, wherein a plurality of the external fixing brackets are fixed to both sides of the lower case.

10. The vehicle battery system according to claim 1, further comprising:

external fixing brackets connected to the exterior case to fix the exterior case to the vehicle, wherein the lower case and the external fixing brackets are metal plates having different thicknesses.

11. The vehicle battery system according to claim 1, further comprising:

external fixing brackets connected to the exterior case to fix the exterior case to the vehicle, wherein the lower case has fitting portions for specifying fixing positions of the external fixing brackets by a fitting structure, and the fitting portions are provided at a plurality of positions apart from each other in the longitudinal direction of the side walls of the lower case.

12. A vehicle mounting the vehicle battery system according to claim 1, the vehicle comprising:

the vehicle battery system;

a driving motor powered by the vehicle battery system;

a vehicle body mounting the vehicle battery system and the driving motor; and wheels that are driven by the driving motor to drive the vehicle body, wherein the vehicle battery system is fixed to the vehicle.

13. The vehicle mounting the vehicle battery system according to claim 12, wherein the vehicle battery system is fixed to a chassis of the vehicle.

14. The vehicle mounting the vehicle battery system according to claim 13, wherein the chassis of the vehicle has protrusions protruding from an upper surface and extending in parallel with each other, and the vehicle battery system further comprises:

external fixing brackets connected to the exterior case to fix the exterior case to the vehicle, and the vehicle battery system is provided between adjacent protrusions among the protrusions to fix the exterior case to the protrusions via the external fixing brackets.

15. The vehicle mounting the vehicle battery system according to claim 14, wherein the vehicle battery system is fixed to the chassis via the plurality of the external fixing brackets.

* * * * *